(12) United States Patent
Randel et al.

(10) Patent No.: US 9,264,145 B2
(45) Date of Patent: Feb. 16, 2016

(54) OPTICAL RECEIVER HAVING A CHROMATIC-DISPERSION COMPENSATION MODULE WITH A MULTIBRANCH FILTER-BANK STRUCTURE

(71) Applicant: Alcatel-Lucent, Paris (FR)

(72) Inventors: Sebastian A. Randel, Aberdeen, NJ (US); Fabian N. Hauske, Woerthsee (DE); Noriaki Kaneda, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/154,370

(22) Filed: Jan. 14, 2014

(65) Prior Publication Data
US 2014/0356003 A1 Dec. 4, 2014

Related U.S. Application Data

(60) Provisional application No. 61/829,448, filed on May 31, 2013.

(51) Int. Cl.
*H04B 1/10* (2006.01)
*H04B 10/12* (2006.01)
*H04B 10/61* (2013.01)

(52) U.S. Cl.
CPC .................................. *H04B 10/616* (2013.01)

(58) Field of Classification Search
CPC ... G10L 19/0204; G10L 25/18; G10L 19/032; H03H 17/0266; H03H 2021/0041; H03H 19/63; H03H 25/14; H03H 27/0004
USPC .................................. 375/350; 398/147, 149
See application file for complete search history.

(56) References Cited

U.S. PATENT DOCUMENTS

RE38,289 E * 10/2003 Bergano .......................... 398/75
6,683,855 B1    1/2004 Bordogna et al.
(Continued)

FOREIGN PATENT DOCUMENTS

WO    2010107439 A1    9/2010

OTHER PUBLICATIONS

Slim, Israa, et al., "Delayed Single-Tap Frequency-Domain Chromatic-Dispersion Compensation," IEEE Photonics Technology Letters, vol. 25, No. 2, Jan. 15, 2013, pp. 167-170.
(Continued)

*Primary Examiner* — Don N Vo
(74) *Attorney, Agent, or Firm* — Mendelsohn, Drucker & Dunleavy, P.C.; Yuri Gruzdkov

(57) ABSTRACT

An optical receiver having an electronic dispersion-compensation module with two parallel signal-processing branches configured to provide a greater range of dispersion compensation than that provided by a prior-art device of comparable implementation complexity. In an example embodiment, each of the signal-processing branches includes a respective bank of finite-impulse-response filters that are configured in accordance with a different respective approximation of the group delay that needs to be compensated. The two group-delay approximations used by the filter banks rely on different respective step functions, each having a respective plurality of quantized steps, with the transitions between adjacent steps in one step function being spectrally aligned with the flat portions of the corresponding steps in the other step function. The filter banks may be further configured to apply different respective frequency-dependent phase-shift and/or amplitude-scaling profiles designed to reduce signal distortions associated with the transitions between adjacent steps in the step functions.

29 Claims, 10 Drawing Sheets

(56) References Cited

U.S. PATENT DOCUMENTS

| | | | |
|---|---|---|---|
| 7,212,741 | B2 | 5/2007 | Myong et a |
| 7,266,310 | B1 | 9/2007 | Savory et al. |
| 7,424,651 | B2 | 9/2008 | Domagala et al. |
| 7,574,146 | B2 | 8/2009 | Chiang et al. |
| 7,636,525 | B1 | 12/2009 | Bontu et al. |
| 7,734,191 | B1 | 6/2010 | Welch et al. |
| 8,260,154 | B2 | 9/2012 | Chang et al. |
| 2008/0152361 | A1 | 6/2008 | Chen et al. |
| 2009/0238578 | A1* | 9/2009 | Taylor .......................... 398/147 |
| 2010/0158521 | A1 | 6/2010 | Doerr et al. |
| 2010/0178057 | A1* | 7/2010 | Shieh .............................. 398/79 |
| 2011/0038631 | A1 | 2/2011 | Doerr |
| 2012/0057863 | A1 | 3/2012 | Winzer et al. |
| 2013/0230312 | A1 | 9/2013 | Randel et al. |

OTHER PUBLICATIONS

U.S. Appl. No. 13/628,412, filed Sep. 27, 2012.
U.S. Appl. No. 13/729,403, filed Dec. 28, 2012.

International Search Report and Written Opinion; Mailed Feb. 20, 2015 for the corresponding PCT Application No. PCT/IB2014/001291.

Ho, K., "Subband Equaliser for Chromatic Dispersion of Optical fibre." Electronics Letters, Nov. 2009, vol. 45, No. 24, pp. 1224-1226.

Taylor, M. G., "Compact Digital Dispersion Compensation Algorithms," Optical Fiber Communication/National Fiber Optic Engineers Conference, OFC/NFOEC 2008. IEEE, Piscataway, NJ, USA, Feb. 24, 2008, pp. 1-3.

Geyer, J. C., et al., "Efficient Frequency Domain Chromatic Dispersion Compensation in a Coherent Polmux QPSK-Receiver," Optical Fiber Communication/National Fiber Optic Engineers Conference, OFC/NFOEC 2010, IEEE Piscataway, NJ, USA, Mar. 21, 2010, pp. 1-3.

* cited by examiner

200

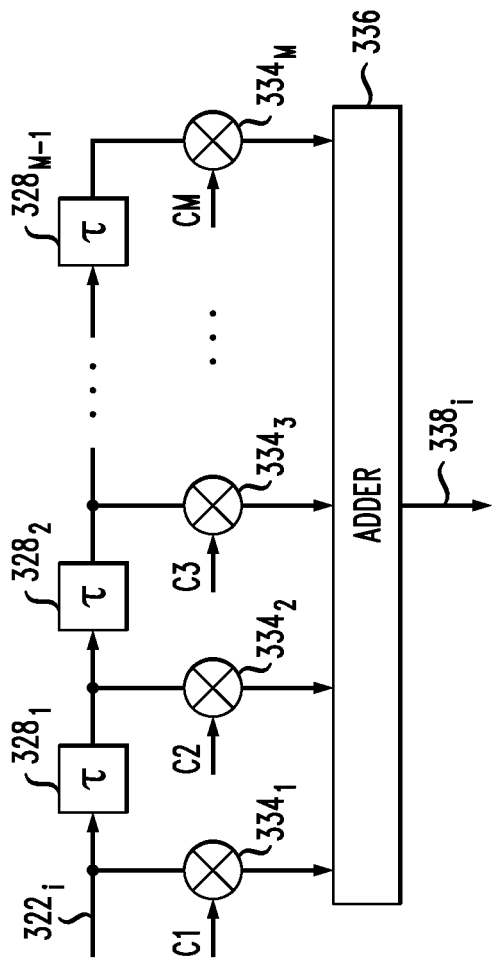

700

800

OPTICAL RECEIVER HAVING A CHROMATIC-DISPERSION COMPENSATION MODULE WITH A MULTIBRANCH FILTER-BANK STRUCTURE

CROSS-REFERENCE TO RELATED APPLICATIONS

This application claims priority from U.S. Provisional Patent Application No. 61/829,448, filed on May 31, 2013, and entitled "OPTICAL RECEIVER HAVING A CHROMATIC-DISPERSION COMPENSATION MODULE WITH A MULTIBRANCH FILTER-BANK STRUCTURE."

BACKGROUND

1. Field

The present disclosure relates to optical communication equipment and, more specifically but not exclusively, to optical receivers configured to perform chromatic-dispersion (CD) compensation processing.

2. Description of the Related Art

This section introduces aspects that may help facilitate a better understanding of the claimed invention(s). Accordingly, the statements of this section are to be read in this light and are not to be understood as admissions about what is in the prior art or what is not in the prior art.

Chromatic dispersion (CD) is one of the most-common impairments in fiber-optic transmission systems. In coherent transmission, CD can be compensated using a digital signal processor, e.g., implemented as an application specific integrated circuit (ASIC) located in the back end of an optical receiver. One of the technical problems that the designers of coherent optical receivers attempt to solve is to reduce the complexity (and therefore the power consumption associated with) the CD-compensation module(s) of the ASIC while maintaining or even increasing the maximum amount of CD that can be compensated therein.

SUMMARY OF SOME SPECIFIC EMBODIMENTS

Disclosed herein are various embodiments of an optical receiver having an electronic dispersion-compensation module with two parallel signal-processing branches configured to provide a greater range of dispersion compensation than that provided by a prior-art device of comparable implementation complexity. In an example embodiment, each of the signal-processing branches includes a respective bank of finite-impulse-response filters that are configured in accordance with a different respective approximation of the group delay that needs to be compensated. The two group-delay approximations used by the filter banks rely on different respective step functions, each having a respective plurality of quantized steps, with the transitions between adjacent steps in one step function being spectrally aligned with the flat portions of the corresponding steps in the other step function. The filter banks may be further configured to apply different respective frequency-dependent phase-shift and/or amplitude-scaling profiles designed to reduce signal distortions associated with the transitions between adjacent steps in the step functions.

According to one embodiment, provided is an apparatus comprising: an optical-to-electrical converter configured to mix an optical input signal with an optical reference signal to generate a plurality of electrical digital measures of the optical input signal; and a digital circuit configured to process the plurality of electrical digital measures to recover data encoded in the optical input signal. The digital circuit comprises: a first signal-processing branch having a first plurality of linear filters, each configured to apply a respective first quantized delay to a respective spectral sub-band of a first set of spectral sub-bands corresponding to the optical input signal to generate a respective one of a plurality of first delayed spectral sub-bands; and a second signal-processing branch having a second plurality of linear filters, each configured to apply a respective second quantized delay to a respective spectral sub-band of a second set of spectral sub-bands corresponding to the optical input signal to generate a respective one of a plurality of second delayed spectral sub-bands. The digital circuit is configured to: combine digital signals corresponding to the first delayed spectral sub-bands and the second delayed spectral sub-bands to generate a processed digital signal; and recover the data based on the processed digital signal.

According to another embodiment, provided is a signal-processing method comprising the steps of: (A) generating a first approximation of a group delay corresponding to a received optical signal, said first approximation being based on a first step function, wherein each step has a fixed amplitude; (B) generating a second approximation of the group delay, said first approximation being based on a second step function, wherein each step has the fixed amplitude, said second step function being different from the first step function; (C) applying a respective first quantized delay determined from the first step function to a respective spectral sub-band of a first set of spectral sub-bands corresponding to the received optical signal to generate a respective one of a plurality of first delayed spectral sub-bands; (D) applying a respective second quantized delay determined from the second step function to a respective spectral sub-band of a second set of spectral sub-bands corresponding to the received optical signal to generate a respective one of a plurality of second delayed spectral sub-bands; and (E) combining electrical digital signals corresponding to the first delayed spectral sub-bands and the second delayed spectral sub-bands to generate a processed electrical digital signal in a manner that at least partially compensates effects of chromatic dispersion associated with the group delay on the processed electrical digital signal.

According to yet another embodiment, provided is an apparatus comprising: means for generating a first approximation of a group delay corresponding to a received optical signal, said first approximation being based on a first step function, wherein each step has a fixed amplitude; means for generating a second approximation of the group delay, said first approximation being based on a second step function, wherein each step has the fixed amplitude, said second step function being different from the first step function; means for applying a respective first quantized delay determined from the first step function to a respective spectral sub-band of a first set of spectral sub-bands corresponding to the received optical signal to generate a respective one of a plurality of first delayed spectral sub-bands; means for applying a respective second quantized delay determined from the second step function to a respective spectral sub-band of a second set of spectral sub-bands corresponding to the received optical signal to generate a respective one of a plurality of second delayed spectral sub-bands; and means for combining electrical digital signals corresponding to the first delayed spectral sub-bands and the second delayed spectral sub-bands to generate a processed electrical digital signal in a manner that at least partially compensates effects of chromatic dispersion associated with the group delay on the processed electrical digital signal.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 3A-3B show block diagrams of a CD-compensation module that can be used in the digital circuit of FIG. 2 according to an embodiment of the disclosure;

DETAILED DESCRIPTION

Figure 1:
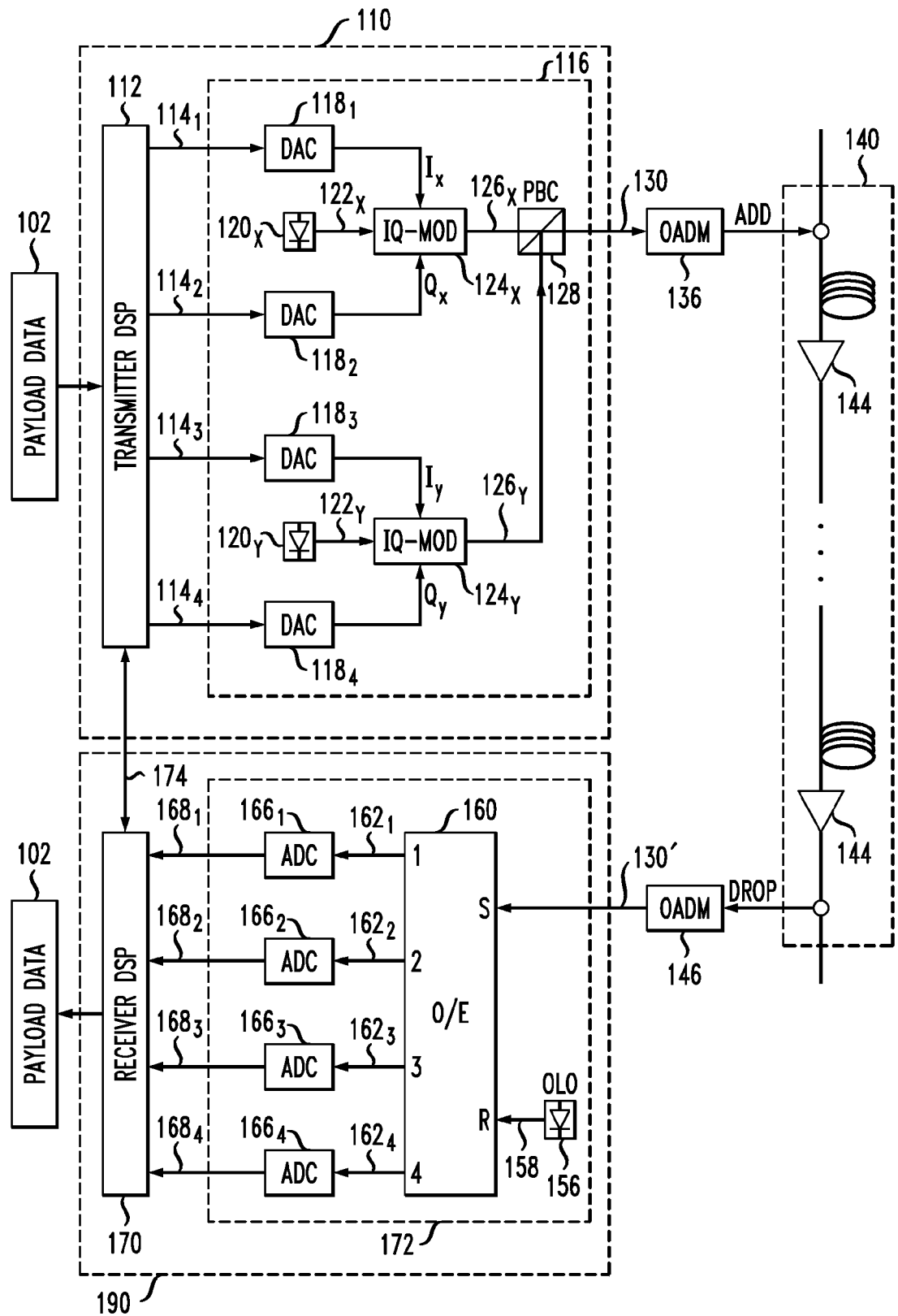
FIG. 1 shows a block diagram of an optical transport system in which various embodiments of the disclosure can be practiced.

FIG. 1 shows a block diagram of an optical transport system 100 in which various embodiments of the disclosure can be practiced. System 100 has an optical transmitter 110 that is configured to (i) modulate light using constellation symbols and (ii) apply a resulting optical output signal 130 to an optical transport link 140. System 100 also has an optical receiver 190 that is configured to appropriately process a corresponding optical input signal 130' received via optical transport link 140 from transmitter 110 to recover the corresponding original data. Note that optical transport link 140 transforms signal 130 into signal 130' by imposing various signal distortions including, inter alia, chromatic dispersion. Both transmitter 110 and receiver 190 rely on the same selected constellation in the processes of generating signal 130 and decoding signal 130', respectively.

Transmitter 110 receives a digital (electrical) input stream 102 of payload data and applies it to a digital signal processor (DSP) 112. DSP 112 processes input stream 102 to generate digital signals $114_1$-$114_4$. Such processing may include, e.g., forward-error-correction (FEC) encoding, which adds redundancy to the transmitted data, and various forms of pre-compensation processing, which causes optical input signal 130' to be less distorted than without such pre-compensation processing. In each signaling interval (also referred to as a time slot corresponding to an optical symbol or a symbol period), signals $114_1$ and $114_2$ carry digital values that represent the in-phase (I) component and quadrature (Q) component, respectively, of a corresponding constellation point intended for transmission using X-polarized light. Signals $114_3$ and $114_4$ similarly carry digital values that represent the I and Q components, respectively, of the corresponding constellation point intended for transmission using Y-polarized light, where the Y-polarization is orthogonal to the X-polarization.

An electrical-to-optical (E/O) converter (also sometimes referred to as a front-end circuit) 116 of transmitter 110 transforms digital signals $114_1$-$114_4$ into modulated optical output signal 130. More specifically, digital-to-analog converters (DACs) $118_1$ and $118_2$ transform digital signals $114_1$ and $114_2$ into an analog form to generate drive signals $I_X$ and $Q_X$, respectively. Drive signals $I_X$ and $Q_X$ are then used, in a conventional manner, to drive an I-Q modulator $124_X$. Based on drive signals $I_X$ and $Q_X$, I-Q modulator $124_X$ modulates an X-polarized beam $122_X$ of light supplied by a laser source $120_X$, thereby generating a modulated optical signal $126_X$.

DACs $118_3$ and $118_4$ similarly transform digital signals $114_3$ and $114_4$ into an analog form to generate drive signals $I_Y$ and $Q_Y$, respectively. Based on drive signals $I_Y$ and $Q_Y$, an I-Q modulator $124_Y$ modulates a Y-polarized beam $122_Y$ of light supplied by a laser source $120_Y$, thereby generating a modulated optical signal $126_Y$.

In an alternative embodiment, laser sources $120_X$ and $120_Y$ can be replaced by a single laser source coupled to an optical splitter so that (i) an output port of the optical splitter that outputs X-polarized light is configured to provide X-polarized beam $122_X$ and (ii) an output port of the optical splitter that outputs Y-polarized light is configured to provide Y-polarized beam $122_Y$.

A polarization beam combiner 128 combines modulated optical signals $126_X$ and $126_Y$ to generate optical output signal 130.

Optical output signal 130 can be applied to an optional optical add-drop multiplexer (OADM) 136 configured to add this signal, as known in the art, to other optical signals that are being transported via optical transport link 140.

Link 140 is illustratively shown as being an amplified link having a plurality of optical amplifiers 144 configured to amplify the optical signals that are being transported through the link, e.g., to counteract signal attenuation. Note that an optical link that has only one or even no optical amplifiers can alternatively be used as well. After propagating the intended length of link 140, optical signal 130 becomes optical signal 130', which is dropped from the link via another optional optical add-drop multiplexer, OADM 146, and directed to receiver 190 for processing.

Receiver 190 has a front-end circuit 172 comprising an optical-to-electrical (O/E) converter 160, four analog-to-digital converters (ADCs) $166_1$-$166_4$, and an optical local oscillator (OLO) 156. O/E converter 160 has (i) two input ports labeled S and R and (ii) four output ports labeled 1 through 4. Input port S receives optical signal 130'. Input port R receives an optical reference signal 158 generated by OLO 156. Reference signal 158 has an optical-carrier frequency (wavelength) that is sufficiently close to that of signal 130' to enable intradyne or homodyne detection of the latter signal. Reference signal 158 can be generated, e.g., using a relatively stable tunable laser whose output wavelength is approximately the same as the carrier wavelength of input signal 130'.

O/E converter 160 operates to mix input signal 130' and reference signal 158 to generate eight mixed optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog in-phase signal and an analog quadrature signal, respectively, corresponding to the X-polarization component of signal 130'. Electrical signals 162₃ and 162₄ may similarly be an analog in-phase signal and an analog quadrature signal, respectively, corresponding to the Y-polarization component of signal 130'.

In one embodiment, O/E converter 160 is a polarization-diverse 90-degree optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

Each of electrical signals 162₁-162₄ generated by O/E converter 160 is converted into digital form in a corresponding one of ADCs 166₁-166₄. Optionally, each of electrical signals 162₁-162₄ may be amplified in a corresponding amplifier (not explicitly shown) prior to the resulting signal being converted into digital form. Digital signals 168₁-168₄ produced by ADCs 166₁-166₄ are then appropriately processed by a digital signal processor (DSP) 170 to recover the data of the original input stream 102 applied to transmitter 110.

DSP 170 is configured to decode digital signals 168₁-168₄ to recover original payload data 102. In particular, DSP 170 is configured to perform CD-compensation (CDC) processing, e.g., as further described below in reference to FIGS. 2-9. In addition to the CDC processing, DSP 170 may be configured to perform other signal processing, such as (i) signal equalization and (ii) carrier- and data-recovery (CDR) processing. Signal equalization is generally directed at reducing the detrimental effects of various additional signal impairments imparted onto the received optical signal in the optical transport link. Such additional signal impairments might include, but are not limited to polarization distortion (PD), polarization-mode dispersion (PMD), additive noise, and spectral distortion. One of ordinary skill in the art will appreciate that these signal impairments might accrue in the optical link through either localized or distributed mechanisms, or through a combination of both types of mechanisms. The CDR processing is generally directed at reducing the detrimental effects of phase noise and/or local-oscillator phase error to enable receiver 190 to recover the transmitted data with a relatively low BER.

Description of the additional signal processing that can be implemented in DSP 170 according to various embodiments of the disclosure can be found, e.g., in U.S. Patent Application Publication No. 2013/0230312 and U.S. patent application Ser. No. 13/628,412 (attorney docket ref. 811303-US-NP, filed on Sep. 27, 2012) and Ser. No. 13/729,403 (attorney docket ref. 812179-US-NP, filed on Dec. 28, 2012), all of which are incorporated herein by reference in their entirety.

Figure 2:
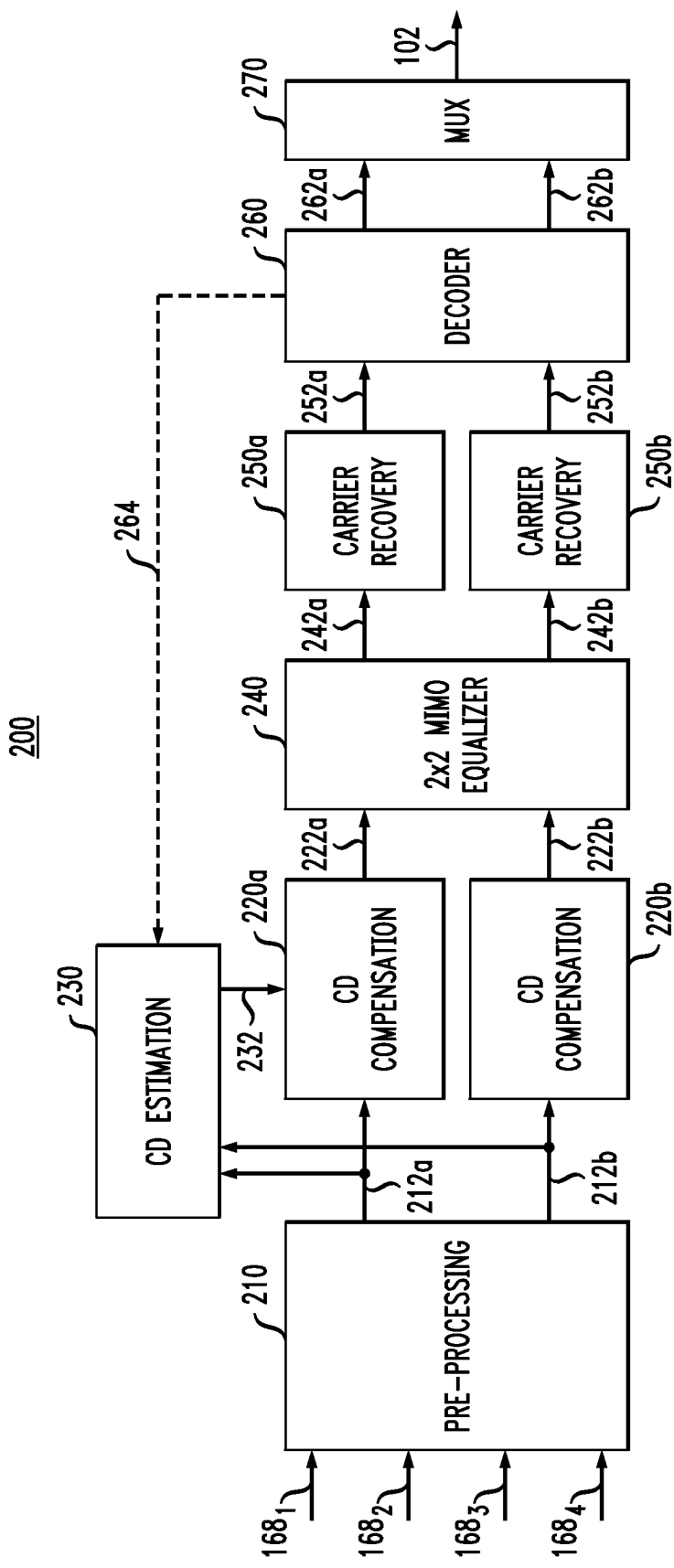
FIG. 2 shows a block diagram of a digital circuit that can be used in the optical transport system of FIG. 1 according to an embodiment of the disclosure.

FIG. 2 shows a block diagram of a digital circuit 200 that can be used in DSP 170 (FIG. 1) according to an embodiment of the disclosure. Digital circuit 200 is illustratively shown in FIG. 2 as being configured to (i) receive digital signals 168₁-168₄ and (ii) generate the recovered data stream 102 (also see FIG. 1). In alternative embodiments, additional signal-processing modules may be used, e.g., to condition digital signals 168₁-168₄ prior to their application to digital circuit 200.

Ideally, digital signals 168₁-168₂ represent the I and Q components, respectively, of the first polarization component (e.g., X) of optical signal 130, and digital signals 168₃-168₄ represent the I and Q components, respectively, of the second polarization component (e.g., Y) of that input signal. However, optical-link impairments, receiver-implementation imperfections, and configuration inaccuracies generally cause each of digital signals 168₁-168₄ to be a convoluted signal that has various signal distortions and/or contributions from both of the original polarization components (such as signals 126_X and 126_Y). The train of signal processing implemented in digital circuit 200 is generally directed at reducing the adverse effects of various signal distortions and de-convolving digital signals 168₁-168₄ so that the encoded data can be properly recovered to generate output data stream 102.

Digital circuit 200 has a signal-pre-processing module 210 configured to receive digital signals 168₁-168₄. One function of module 210 may be to adapt the signal samples received via digital signals 168₁-168₄ to a form suitable for the signal-processing algorithms implemented in the downstream modules of digital circuit 200. For example, module 210 may be configured to convert the signal samples received via digital signals 168₁-168₄ into the corresponding complex-valued signal samples for digital signals 212a and 212b.

In one embodiment, module 210 may also be configured to reduce signal distortions imposed by front-end circuit 172 (see FIG. 1). Said distortions may be caused, e.g., by incorrect biasing of various electro-optical components in O/E converter 160, imperfect signal splitting in power and polarization splitters and optical couplers, frequency dependence and variability of the O/E conversion characteristics of the photo-detectors, etc. Representative signal-processing methods that can be implemented in module 210 for this purpose are disclosed, e.g., in commonly owned U.S. Patent Application Publication No. 2012/0057863, which is incorporated herein by reference in its entirety.

Complex-valued digital signals 212a and 212b are applied to CDC modules 220a and 220b, respectively, for CDC processing therein, and the resulting CDC-processed signals are complex-valued digital signals 222a and 222b. Additional details on the structure and operation of CDC modules 220a and 220b according to various embodiments of the disclosure are provided below in reference to FIGS. 3-9. A CDC controller 230 serves to generate a control signal 232 that appropriately configures various configurable elements within CDC modules 220a and 220b to significantly reduce or substantially cancel the detrimental effects of chromatic dispersion caused by optical transport link 140. CDC controller 230 generates control signal 232 by estimating the group delay in optical transport link 140 based on digital signals 212a and 212b and, optionally, a feedback signal 264 received from one or more downstream modules of digital circuit 200, e.g., as indicated in FIG. 2. Example signal-processing methods that can be adapted for generating control signal 232 in digital circuit 200 are disclosed, e.g., in U.S. Pat. Nos. 8,260,154, 7,636,525, 7,266,310, all of which are incorporated herein by reference in their entirety.

Digital signals 222a and 222b generated by CDC modules 220a and 220b are applied to a 2×2 MIMO (multiple-input/multiple-output) equalizer 240 for MIMO-equalization processing therein, and the resulting equalized signals are complex-valued digital signals 242a and 242b. In one embodiment, equalizer 240 can be a butterfly equalizer configured to perform (i) polarization de-multiplexing and (ii) signal processing directed at further reducing the adverse effects of certain signal impairments, such as polarization-mode dispersion (PMD), polarization-dependent loss (PDL), inter-symbol interference (ISI), and residual CD. An example embodiment of equalizer 240 is disclosed, e.g., in the above-cited U.S. patent application Ser. No. 13/628,412.

Digital signals 242a and 242b generated by equalizer 240 are applied to carrier-recovery modules 250a and 250b, respectively. Together with a signal decoder 260, carrier-recovery modules 250a and 250b carry out the above-mentioned CDR processing, which is generally directed at compensating the frequency mismatch between the carrier frequencies of reference signal 158 and optical signal 130', reducing the effects of phase noise, and recovering the transmitted data. Various signal-processing techniques that can be used to implement the frequency-mismatch compensation are disclosed, e.g., in U.S. Pat. No. 7,747,177 and U.S. Patent Application Publication No. 2008/0152361, both of which are incorporated herein by reference in their entirety. Representative signal-processing techniques that can be used to implement phase-error correction are disclosed, e.g., in the above-cited U.S. Patent Application Publication No. 2013/0230312.

Digital signals 252a and 252b generated by carrier-recovery modules 250a and 250b, respectively, are applied to decoder 260. Decoder 260 is configured to use the complex values conveyed by digital signals 252a and 252b to appropriately map each received symbol onto an operative constellation and, based on said mapping, recover the corresponding encoded data. In one embodiment, decoder 260 may perform digital processing that implements error correction based on data redundancies (if any) in optical signal 130. Many FEC methods suitable for this purpose are known in the art. Several examples of such methods are disclosed, e.g., in U.S. Pat. Nos. 7,734,191, 7,574,146, 7,424,651, 7,212,741, and 6,683,855, all of which are incorporated herein by reference in their entirety.

Decoder 260 outputs the data recovered from digital signals 252a and 252b via data streams 262a and 262b, respectively. A multiplexer (MUX) 270 then appropriately multiplexes data streams 262a and 262b to generate the recovered data stream 102.

Figure 3A:
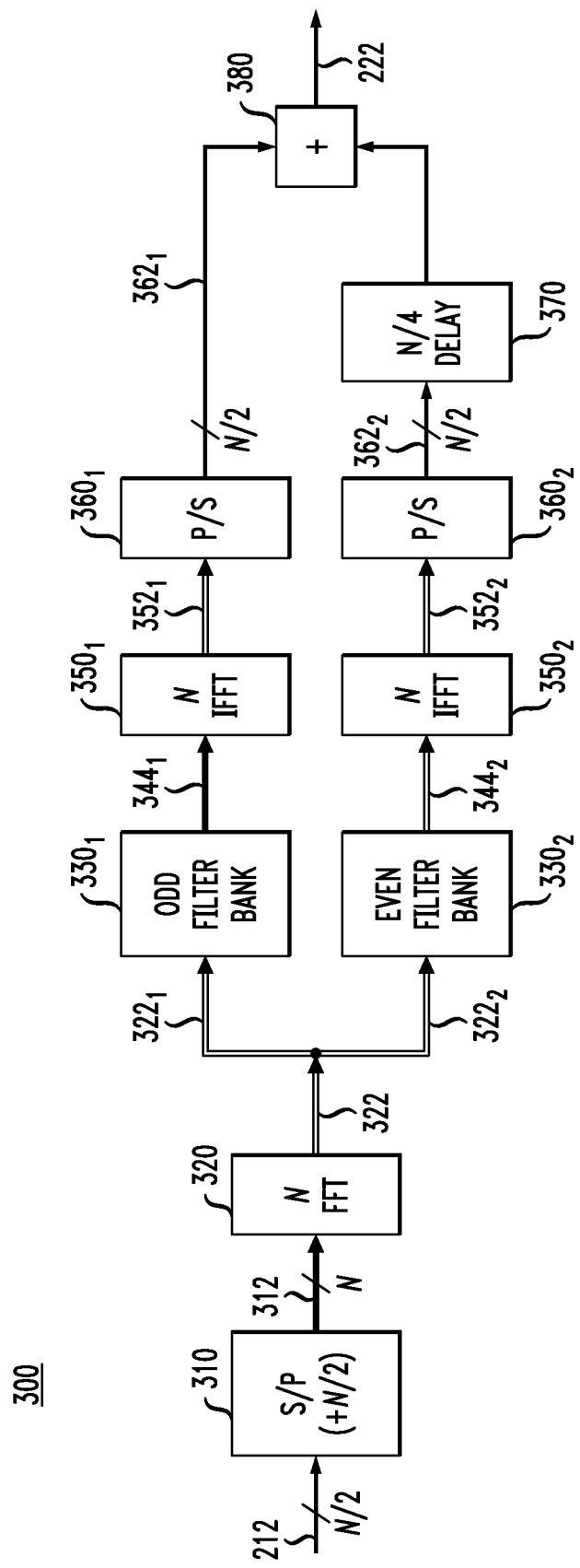

FIGS. 3A-3B show block diagrams of a CDC module 300 that can be used to implement one or each of CDC modules 220a and 220b (FIG. 2) according to an embodiment of the disclosure. More specifically, FIG. 3A shows an overall block diagram of CDC module 300. FIG. 3B shows a block diagram of a finite-impulse-response (FIR) filter 332, multiple instances (copies) of which are used in the filter banks of CDC module 300, e.g., as further described below.

Referring to FIG. 3A, CDC module 300 comprises a serial-to-parallel (S/P) converter 310 configured to (i) receive a digital signal 212 (e.g., digital signal 212a or 212b, FIG. 2) and (ii) output, on a bus 312, a set of digital samples received via digital signal 212. If digital signal 212 provides serialized input and is clocked at frequency f, then S/P converter 310 is clocked at frequency $f_{clk}=2f_s/N$, where N is the number of parallel lines in bus 312. In each clock cycle of frequency $f_{clk}$, S/P converter 310 is configured to (i) append the N/2 digital samples received via digital signal 212 in the present clock cycle to the N/2 digital samples received via digital signal 212 in the previous clock cycle and (ii) place the resulting set of N digital samples on the N lines of bus 312, one digital sample per line, for transfer to a fast-Fourier-transform (FFT) module 320.

In an alternative embodiment, digital signal 212 may be provided on a bus having a buswidth of N/2. In this embodiment, digital signal 212 is clocked at frequency $f_{clk}=2f_s/N$, and S/P converter 310 operates as a parallel-to-parallel interface between two busses of different buswidths, e.g., the buswidth of N/2 for the input bus that delivers digital signal 212 and the buswidth of N for the output bus 312.

In each clock cycle of frequency $f_{clk}$, FFT module 320 is configured to apply a Fourier transform to the set of N digital samples received on bus 312, thereby generating a set 322 of N spectral samples (which can alternatively be referred to as "spectral sub-bands"). Two copies of set 322, labeled $322_1$ and $322_2$, are then applied to an "odd" filter bank $330_1$ and an "even" filter bank $330_2$, respectively. Each of filter banks $330_1$ and $330_2$ includes N FIR filters 332, with each of said FIR filters 332 being configured to receive a respective one of the N spectral samples from FFT module 320 in each clock cycle of frequency $f_{clk}$. A result of the filtering performed in filter bank $330_1$ is a filtered set of N spectral samples that is applied to a bus $344_1$. Similarly, a result of the filtering performed in filter bank $330_2$ is a filtered set of N spectral samples that is applied to a bus $344_2$.

Referring to FIG. 3B, FIR filter 332 is an M-tap FIR filter comprising (i) M−1 delay elements $328_1$-$328_{M-1}$; (ii) M multipliers $334_1$-$334_M$; and (iii) an adder 336. FIR filter 332 is illustratively shown as being configured to (i) receive an i-th stream $322_1$ of spectral samples 322 and (ii) generate an i-th stream $338_1$ of filtered spectral samples. If FIR filter 332 is a part of odd filter bank $330_1$, then stream $338_1$ appears on an i-th line of bus $344_1$. If FIR filter 332 is a part of even filter bank $330_2$, then stream $338_1$ appears on an i-th line of bus $344_2$.

Each of delay elements $328_1$-$328_{M-1}$ is configured to introduce a time delay τ. In one embodiment, $τ=T_{clk}$, where $T_{clk}=1/f_{clk}$. In an alternative embodiment, $τ=2T_{clk}$.

Each of multipliers $334_1$-$334_M$ is configured to multiply a corresponding delayed copy of the spectral sample provided by stream $322_1$ by a respective coefficient $C_k$, where k=1, 2, . . . , M. The values of coefficients $C_k$ can be determined by CDC controller 230, e.g., as further described below in reference to FIGS. 4-6, and then applied to FIR filters 332 in filter banks $330_1$ and $330_2$ via control signal 232 (see FIG. 2). In operation, different instances (copies) of FIR filter 332 in filter banks $330_1$ and $330_2$ (FIG. 3A) are typically configured to use different respective sets of coefficients $C_1$-$C_M$, which can be changed over time, e.g., to track time variations in the dispersion characteristics of link 140 (FIG. 1).

Adder 336 is configured to sum the output signals generated by multipliers $334_1$-$334_M$ to generate filtered spectral samples for stream $338_i$. In one embodiment, the number (M) of taps in FIR filter 332 can be between two and twelve. In some embodiments, a significantly larger number of taps can similarly be used.

Referring back to FIG. 3A, busses $344_1$ and $344_2$ are coupled to inverse FFT (IFFT) modules $350_1$ and $350_2$, respectively. In each clock cycle of frequency $f_{clk}$, IFFT module $350_1$ is configured to apply an inverse Fourier transform to the set of N filtered spectral samples received on bus $344_1$, thereby generating a corresponding set of N filtered time-domain samples, which appear on the respective lines of a bus $352_1$. IFFT module $350_2$ is similarly configured to apply an inverse Fourier transform to the set of N filtered spectral samples received on bus $344_2$, thereby generating a corresponding set of N filtered time-domain samples, which appear on the respective lines of a bus $352_2$.

Busses $352_1$ and $352_2$ are coupled to parallel-to-serial (P/S) converters $360_1$ and $360_2$, respectively. In each clock cycle of frequency $f_{clk}$, P/S converter $360_1$ is configured to truncate the set of N filtered time-domain samples received on bus $352_1$ down to N/2 samples, e.g., by removing N/2 samples from the beginning of the set. This truncation removes the N/2 filtered time-domain samples originating from the N/2 digital samples added in S/P converter 310 and corresponding to the previous clock cycle. The remaining N/2 filtered time-domain samples are serialized, e.g., by being read out in the consecutive order from the respective lines of bus $352_1$ and then output on an output line $362_1$ at clock frequency $f_s$. P/S converter $360_2$ is configured to perform similar operations with the set of N filtered time-domain samples received on bus $352_2$, thereby generating a stream of filtered time-domain samples clocked at frequency $f_s$ on an output line $362_2$.

In each clock cycle of frequency $f_s$, an adder 380 sums the respective filtered time-domain samples output by P/S converters $360_1$ and $360_2$ on output lines $362_1$ and $362_2$, after a delay element 370 has applied a time delay of $N/4f_s$ to the filtered time-domain samples applied by P/S converter $360_2$ to output line $362_2$. The resulting stream of combined time-domain samples is complex-valued digital signal 222 (also see FIG. 2).

Figure 4:
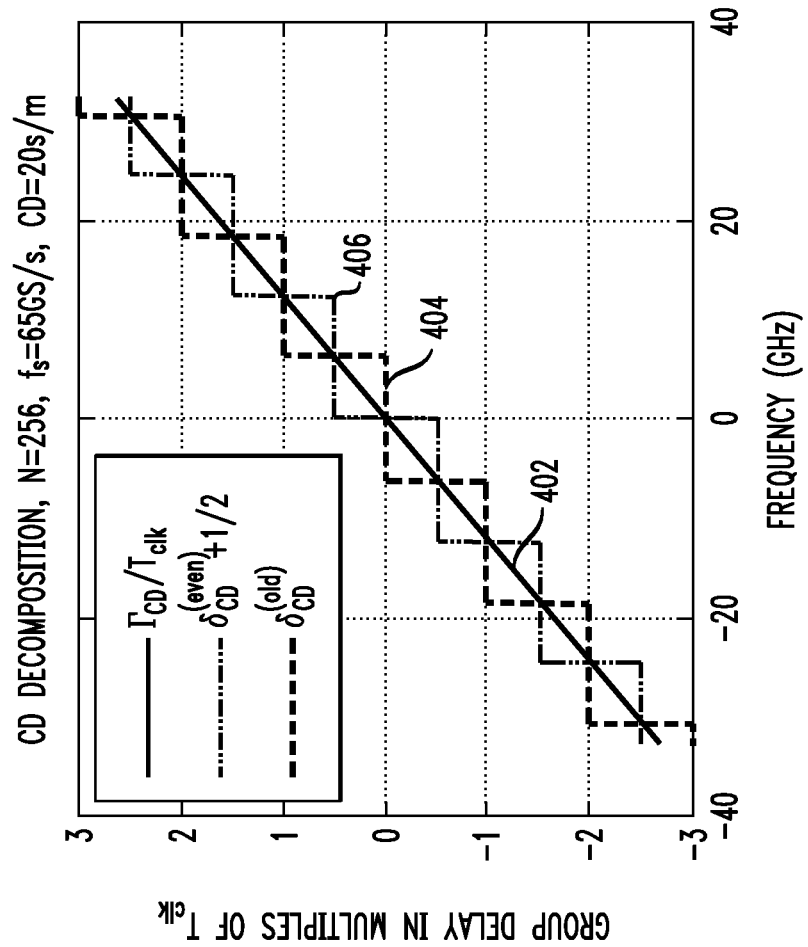
FIG. 4 graphically illustrates the signal processing implemented in the CD-compensation module of FIGS. 3A-3B according to an embodiment of the disclosure.

FIG. 4 graphically illustrates the signal processing implemented in CDC module 300 (FIG. 3A) according to an embodiment of the disclosure. The abscissa in FIG. 4 shows the frequency with respect to the frequency of the optical carrier wave, which corresponds to the value of 0 GHz on the abscissa. The ordinate in FIG. 4 shows the group delay in the units of $T_{clk}$.

A straight line 402 shows a typical dependence of the group delay ($F_{CD}$) on the frequency (f). As known in the art, the group delay is typically a linear function of frequency. When expressed as a set of discrete values $\vec{\Gamma}_{CD}$, the group delay can be approximated, e.g., using Eq. (1) as follows:

$$\vec{\Gamma}_{CD} = \frac{c_0}{f_0^2} CD \vec{f} \quad (1)$$

where $c_0$ is the speed of light in vacuum; $f_0$ is the optical carrier frequency; CD is the group-velocity dispersion; and $\vec{f}$ is a discrete frequency vector. In one embodiment, $f_0 \approx 193.1$ THz, and frequency vector $\vec{f}$ is expressed by Eq. (2):

$$\vec{f} = \left(-\frac{N}{2}, -\frac{N}{2}+1, \ldots, 0, \ldots, \frac{N}{2}-1\right) \times \frac{f_s}{N} \quad (2)$$

The signal-processing approach realized in CDC module 300 uses two alternative representations of Eq. (1), which are hereafter referred to as the "odd decomposition" and the "even decomposition," respectively. The odd decomposition of vector $\vec{\Gamma}_{CD}$, is given by Eq. (3):

$$\vec{\Gamma}_{CD} = \vec{\delta}_{CD}^{(odd)} T_{clk} + \vec{\gamma}_{CD}^{(odd)} \quad (3)$$

where $\vec{\delta}_{CD}^{(odd)}$ is an integer-valued vector generated as $]\vec{\Gamma}_{CD}/T_{clk}[$, where the operator $]\bullet[$ denotes the rounding (either up or down) to the nearest integer; and $\vec{\gamma}_{CD}^{(odd)}$ is a vector consisting of the corresponding residual fractional (in terms of $T_{clk}$) group delays. In FIG. 4, a stepped curve 404 shows the integer-valued vector $\vec{\delta}_{CD}^{(odd)}$ generated in accordance with Eq. (3) and corresponding to the group delay $\vec{\Gamma}_{CD}$ shown by line 402.

The even decomposition of vector $\vec{\Gamma}_{CD}$ is given by Eq. (4):

$$\vec{\Gamma}_{CD} = \left(\vec{\delta}_{CD}^{(even)} + \frac{1}{2}\right) T_{clk} + \vec{\gamma}_{CD}^{(even)} \quad (4)$$

where $\vec{\delta}_{CD}^{(even)}$ is an integer-valued vector generated as $\lfloor \vec{\Gamma}_{CD}/T_{clk} \rfloor$, where the operator $\lfloor \bullet \rfloor$ denotes the rounding down towards the nearest integer; and $\vec{\gamma}_{CD}^{(even)}$ is a vector consisting of the corresponding residual fractional (in terms of $T_{clk}$) group delays. In FIG. 4, a stepped curve 406 shows the vector $$\left(\vec{\delta}_{CD}^{(even)} + \frac{1}{2}\right)$$

generated in accordance with Eq. (4) and corresponding to the group delay $\vec{\Gamma}_{CD}$ shown by line 402. Note that the above definition of the odd and even decompositions results in $\vec{\delta}_{CD}^{(odd)} \geq \vec{\delta}_{CD}^{(even)}$.

Referring back to FIGS. 3A-3B, in one embodiment, FIR filters 332 in odd filter bank $330_1$ can be configured as follows. In an i-th FIR filter $332_i$, all filter coefficients $C_1$-$C_M$ (see FIG. 3B) are set to zero, with the exception of one of those filter coefficients. The non-zero filter coefficient $C_k$ has an index k that is derived from the value of the i-th component of the integer-valued vector $\vec{\delta}_{CD}^{(odd)}$ generated in accordance with Eq. (3). For example, if the i-th component of vector $\vec{\delta}_{CD}^{(odd)}$ is zero, then the only non-zero filter coefficient may be coefficient $C_1$, which is applied to multiplier $334_1$. If the i-th component of vector $\vec{\delta}_{CD}^{(odd)}$ is one, then the only non-zero filter coefficient may be coefficient $C_2$, which is applied to multiplier $334_2$. If the i-th component of vector $\vec{\delta}_{CD}^{(odd)}$ is two, then the only non-zero filter coefficient may be coefficient $C_3$, which is applied to multiplier $334_3$, etc. Note that there is a total of N non-zero filter coefficients in the N FIR filters 332 of odd filter bank $330_1$.

FIR filters 332 in even filter bank $330_2$ can be configured as follows. In an i-th FIR filter $332_i$, all filter coefficients $C_1$-$C_M$ (see FIG. 3B) are set to zero, with the exception of one of those filter coefficients. The non-zero filter coefficient $C_k$ has an index k that is derived from the value of the i-th component of the integer-valued vector $\vec{\delta}_{CD}^{(even)}$ generated in accordance with Eq. (4). For example, if the i-th component of vector $\vec{\delta}_{CD}^{(even)}$ is zero, then the only non-zero filter coefficient may be coefficient $C_1$, which is applied to multiplier $334_1$. If the i-th component of vector $\vec{\delta}_{CD}^{(even)}$ is one, then the only non-zero filter coefficient may be coefficient $C_2$, which is applied to multiplier $334_2$. If the i-th component of vector $\vec{\delta}_{CD}^{(even)}$ is two, then the only non-zero filter coefficient may be coefficient $C_3$, which is applied to multiplier $334_3$, etc. Note that there is a total of N non-zero filter coefficients in the N FIR filters 332 of even filter bank $330_2$. Also note that the delay of $T_{clk}/2$ in Eq. (4) is implemented in CDC module 300 by delay element 370.

If the N non-zero filter coefficients of filter banks $330_1$ and $330_2$ are presented as components of vectors $\vec{H}^{(odd)}$ and $\vec{H}^{(even)}$, respectively, then these vectors can be expressed by Eqs. (5)-(6) as follows:

$$\vec{H}^{(odd)} = \vec{G}^{(odd)} * \exp(-j\pi \vec{\gamma}_{CD}^{(odd)} * \vec{f}) \quad (5)$$

$$\vec{H}^{(even)} = \vec{G}^{(even)} * \exp(-j\pi \vec{\gamma}_{CD}^{(even)} * \vec{f}) \quad (6)$$

where the symbol "*" denotes element-wise multiplication; $\vec{G}^{(odd)}$ and $\vec{G}^{(even)}$ are the vectors that define the amplitude-scaling profiles of filter banks $330_1$ and $330_2$, respectively; $\vec{\gamma}_{CD}^{(odd)}$ and $\vec{\gamma}_{CD}^{(even)}$ are the vectors that have been defined above in reference to Eqs. (3)-(4); and $\vec{f}$ is the frequency vector expressed by Eq. (2). Note that vectors $\vec{\gamma}_{CD}^{(odd)}$ and $\vec{\gamma}_{C}^{(even)}$ define the phase-shift profiles imposed by filter banks $330_1$ and $330_2$, respectively.

Figure 5:
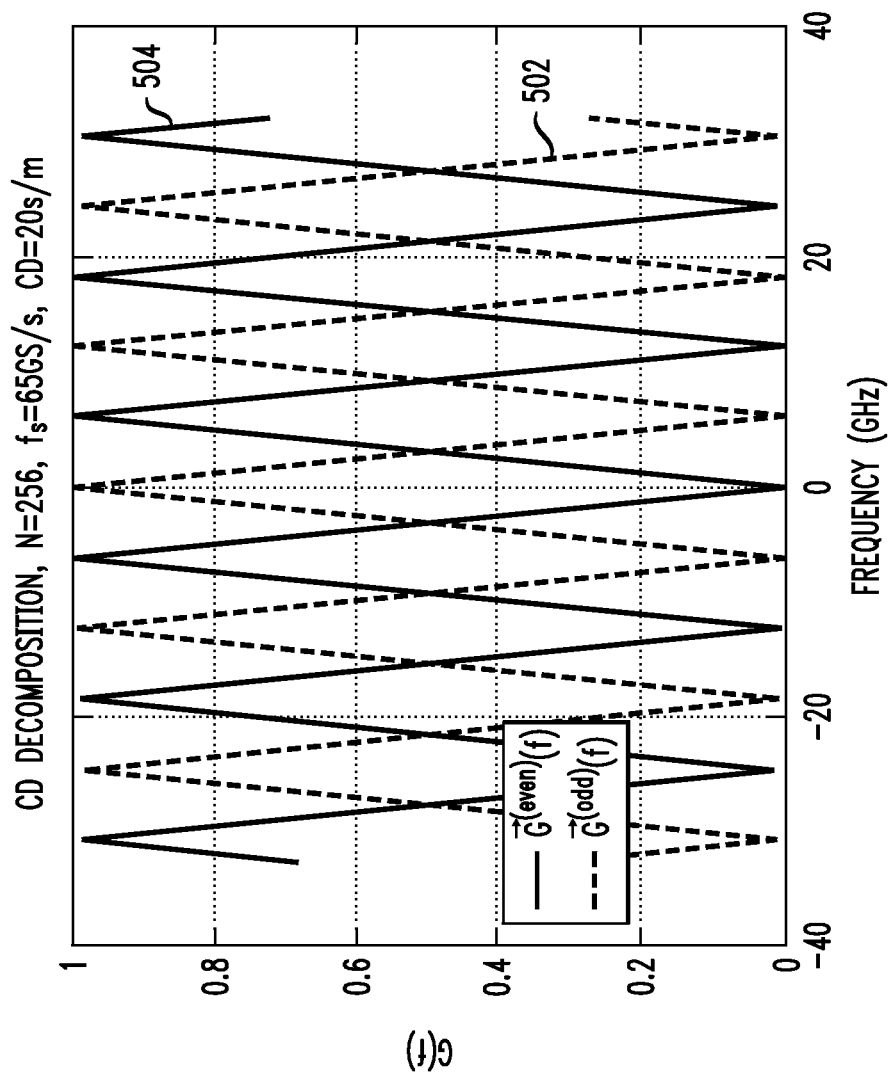
FIG. 5 graphically shows the filtering profiles that can be used in the CD-compensation module of FIGS. 3A-3B according to an embodiment of the disclosure.

FIG. 5 graphically shows the amplitude-scaling profiles that can be used in filter banks $330_1$ and $330_2$ (FIG. 3A) according to an embodiment of the disclosure. More specifically, a curve 502 graphically shows vector $\vec{G}^{(odd)}$ (see Eq. (5)), and a curve 504 graphically shows vector $\vec{G}^{(even)}$ (see Eq. (6)). Each of curves 502 and 504 has a shape corresponding to a plurality of triangular pass bands positioned so as to reduce signal distortions associated with the steps of stepped curves 404 and 406 (FIG. 4). For example, the triangular pass bands of curve 502 are positioned so that (i) the maximum of a triangular pass band is located in the middle of a flat portion of the corresponding step in curve 404 and (ii) the edges of that triangular pass band coincide with the vertical transitions from that step to the adjacent steps in curve 404. Similarly, the triangular pass bands of curve 504 are positioned so that (i) the maximum of a triangular pass band is located in the middle of a flat portion of the corresponding step in curve 406 and (ii) the edges of that triangular pass band coincide with the vertical transitions from that step to the adjacent steps in curve 406. Eqs. (7) and (8) give mathematical expressions for curves 502 and 504, respectively:

$$\vec{G}^{(odd)} = 1 - \frac{2c_0|CD|}{f_0^2 T_{clk}} \left| \vec{f} - \frac{\vec{\delta}_{CD}^{(odd)} f_0^2 T_{clk}}{c_0 CD} \right| \quad (7)$$

$$\vec{G}^{(even)} = 1 - \frac{2c_0|CD|}{f_0^2 T_{clk}} \left| \vec{f} - \frac{(\vec{\delta}_{CD}^{(even)} + 1/2) f_0^2 T_{clk}}{c_0 CD} \right| \quad (8)$$

Figure 6:
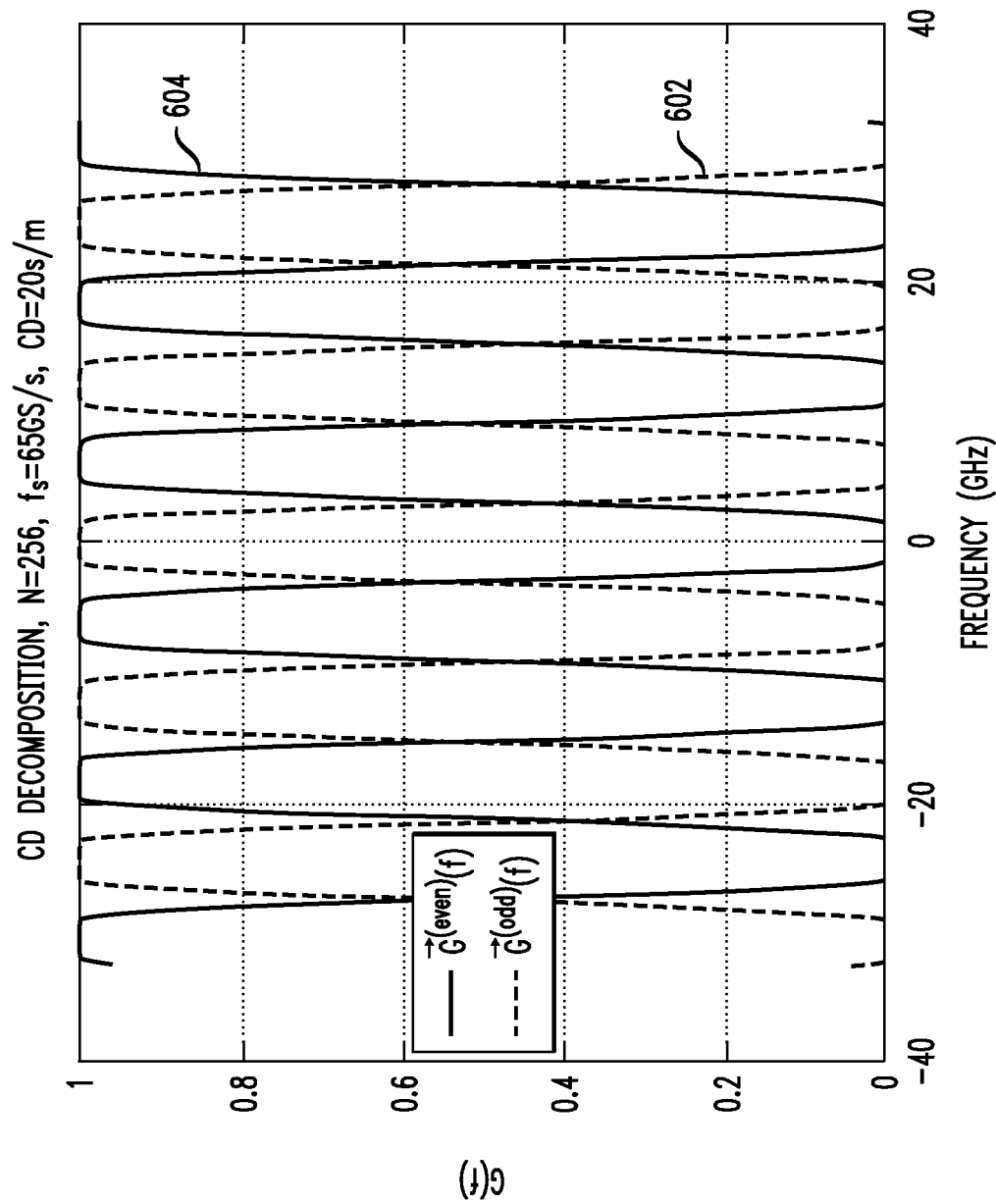
FIG. 6 graphically shows the filtering profiles that can be used in the CD-compensation module of FIGS. 3A-3B according to an alternative embodiment of the disclosure.

FIG. 6 graphically shows the amplitude-scaling profiles that can be used in filter banks $330_1$ and $330_2$ (FIG. 3A) according to an alternative embodiment of the disclosure. More specifically, a curve 602 graphically shows vector $\vec{G}^{(odd)}$ (see Eq. (5)), and a curve 604 graphically shows vector $\vec{G}^{(even)}$ (see Eq. (6)). Each of curves 602 and 604 has a shape corresponding to a plurality of raised-cosine pass bands positioned so as to reduce signal distortions associated with the steps of stepped curves 404 and 406 (FIG. 4). For example, the raised-cosine pass bands of curve 602 are positioned so that (i) the flat portion near the maximum of a raised-cosine pass band is located in the middle of a flat portion of the corresponding step in curve 404 and (ii) the edges of that raised-cosine pass band coincide with the vertical transitions from that step to the adjacent steps in curve 404. Similarly, the raised-cosine pass bands of curve 604 are positioned so that (i) the flat portion near the maximum of a raised-cosine pass band is located in the middle of a flat portion of the corresponding step in curve 406 and (ii) the edges of that raised-cosine pass band coincide with the vertical transitions from that step to the adjacent steps in curve 406.

Additional alternative embodiments may use other raised-cosine filter shapes and/or trapezoidal filter shapes, each with a controllably chosen roll-off factor, to implement vectors $\vec{G}^{(odd)}$ and $\vec{G}^{(even)}$. A value of the roll-off factor that is smaller than one may reduce the number of non-zero coefficients and, as such, can be used to reduce the total number of multipliers in the corresponding ASIC.

Figure 7:
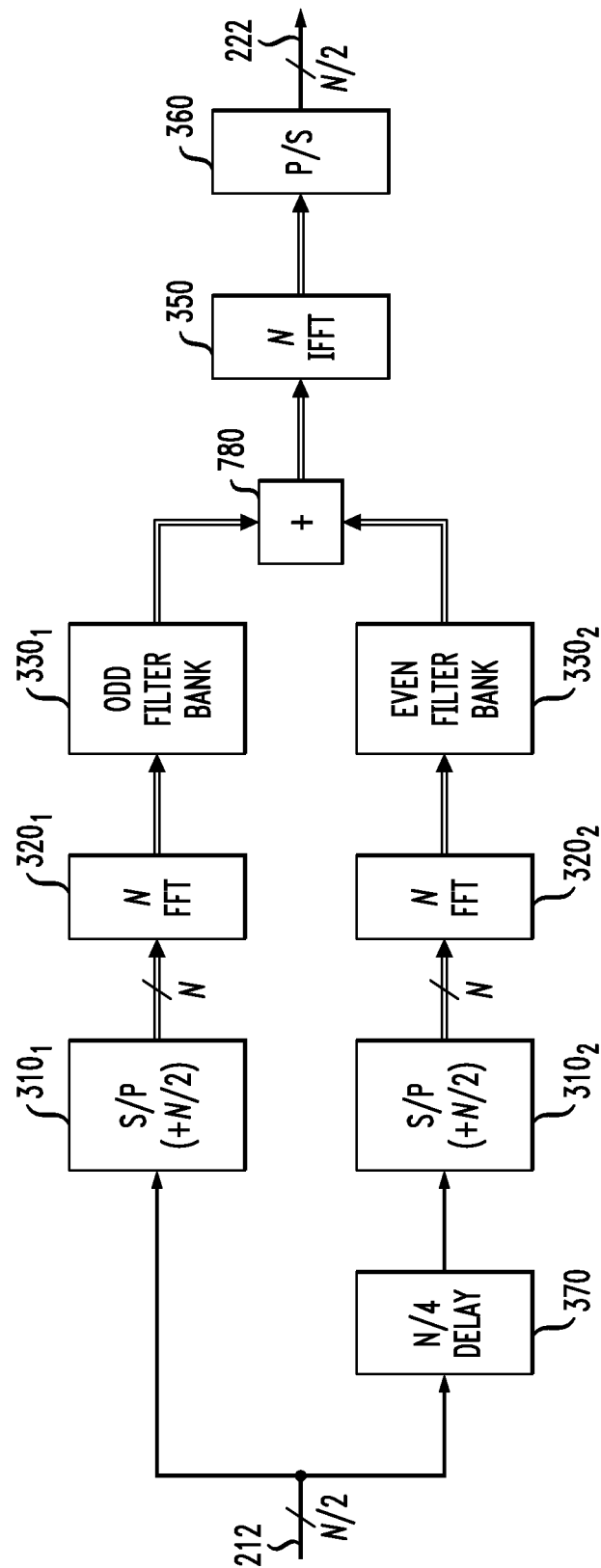
FIG. 7 shows a block diagram of a CD-compensation module that can be used in the digital circuit of FIG. 2 according to an alternative embodiment of the disclosure.

FIG. 7 shows a block diagram of a CDC module 700 that can be used to implement one or each of CDC modules 220a and 220b (FIG. 2) according to an alternative embodiment of the disclosure. CDC module 700 uses many of the same circuit elements as CDC module 300 (FIGS. 3A-3B). The description of these circuit elements is not repeated here. Rather, the below description of CDC module 700 focuses on the differences between CDC modules 300 and 700.

CDC module 700 has two S/P converters 310 (labeled $310_1$ and $310_2$ in FIG. 7) as opposed to a single S/P converter 310 in CDC module 300. Each of S/P converters $310_2$ and $310_2$ is configured to receive a respective copy of digital signal 212. The copy of digital signal 212 received by S/P converter $310_2$ is delayed by delay time $N/4f_s$ with respect to the copy of digital signal 212 received by S/P converter $310_1$. The delay time is imposed by delay element 370, which has been moved from its position after P/S converter $360_2$ in CDC module 300 to the position in front of S/P converter $310_2$ in CDC module 700, as indicated in FIG. 7.

CDC module 700 also has two FFT modules 320 (labeled $320_1$ and $320_2$ in FIG. 7) as opposed to a single FFT module 320 in CDC module 300. FFT modules $320_1$ and $320_2$ are coupled to S/P converters $310_1$ and $310_2$ and filter banks $330_1$ and $330_2$ as indicated in FIG. 7. The outputs of filter banks $330_1$ and $330_2$ are summed in the frequency domain, frequency component to frequency component, using an adder 780. The time-domain adder 380 used in CDC module 300 is not used in CDC module 700.

CDC module 700 has a single IFFT module 350 as opposed to two IFFT modules $350_1$ and $350_2$ in CDC module 300. CDC module 700 also has a single P/S converter 360 as opposed to two P/S converters $360_1$ and $360_2$ in CDC module 300. IFFT module 350 in CDC module 700 is coupled between adder 780 and P/S converter 360 as indicated in FIG. 7. The output generated by P/S converter 360 in CDC module 700 is complex-valued digital signal 222 (also see FIGS. 2 and 3A).

Figure 8:
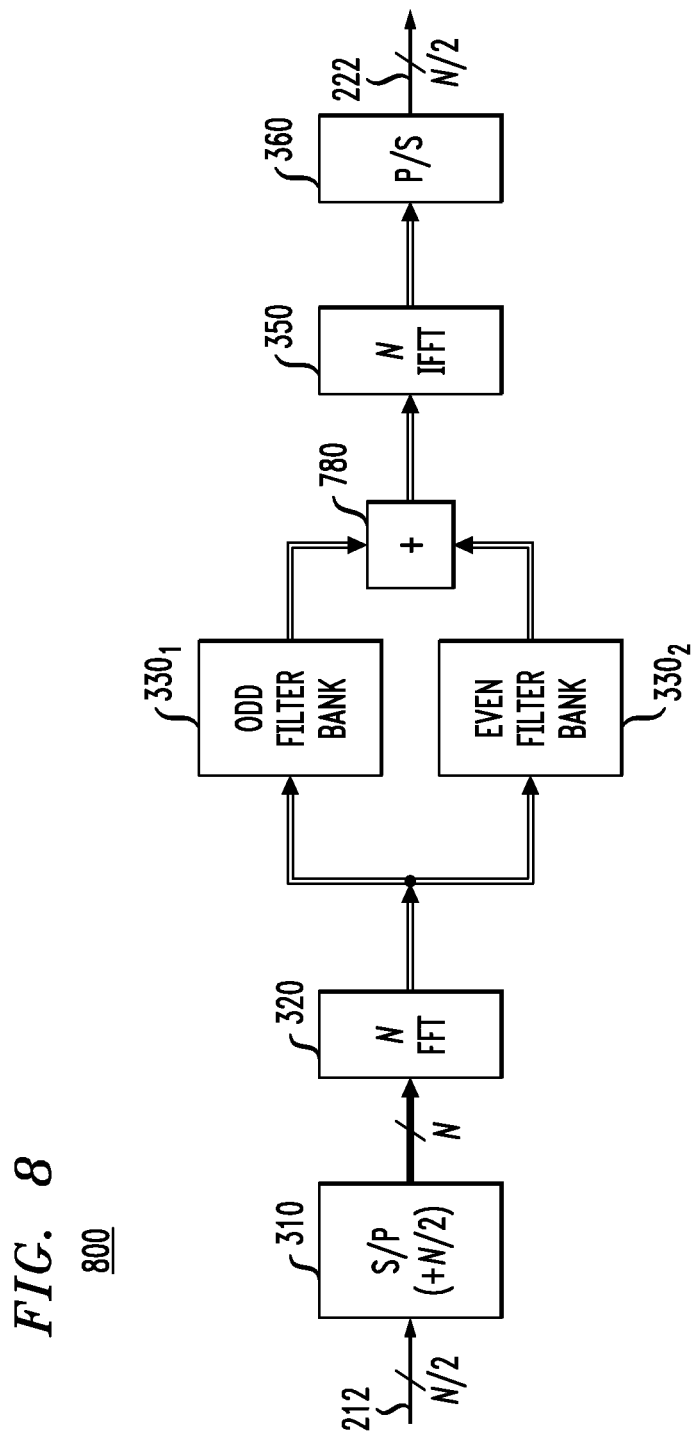
FIG. 8 shows a block diagram of a CD-compensation module that can be used in the digital circuit of FIG. 2 according to yet another alternative embodiment of the disclosure.

FIG. 8 shows a block diagram of a CDC module 800 that can be used to implement one or each of CDC modules 220a and 220b (FIG. 2) according to yet another alternative embodiment of the disclosure. CDC module 800 uses many of the same circuit elements as CDC modules 300 and 700 (FIGS. 3A-3B and 7). The description of these circuit elements is not repeated here. Rather, the below description of CDC module 800 focuses on the features specific to CDC module 800.

The front portion of CDC module 800, which includes S/P converter 310, FFT module 320, and filter banks $330_1$ and $330_2$, is similar to the front portion of CDC module 300 (see FIG. 3A). The back portion of CDC module 800, which includes adder 780, IFFT module 350, and P/S converter 360, is similar to the back portion of CDC module 700 (see FIG. 7). However, one feature specific to CDC module 800 is that it does not have delay element 370. Instead, CDC module 800 is configured to apply a differential delay of $N/4f_s$ seconds or $N/4$ samples between its odd and even branches in the frequency domain by using modified filter coefficients in filter banks $330_1$ and $330_2$. For example, in one embodiment, the vectors $\vec{H}^{(odd)}$ and $\vec{H}^{(even)}$ that have the non-zero filter coefficients used in filter banks $330_1$ and $330_2$ of CDC module 800 can be expressed as follows:

$$\vec{H}^{(odd)} = \vec{G}^{(odd)} * \exp(-j\pi \vec{\gamma}_{CD}^{(odd)} * \vec{f} + j\pi T_{clk} \vec{f}/2) \quad (9)$$

$$\vec{H}^{(even)} = \vec{G}^{(even)} * \exp(-j\pi \vec{\gamma}_{CD}^{(even)} * \vec{f} - j\pi T_{clk} \vec{f}/2) \quad (10)$$

The modification of the filter coefficients that introduces the above-mentioned differential delay in the frequency domain becomes more apparent, e.g., when Eqs. (9)-(10) are compared with Eqs. (5)-(6).

Figure 9:
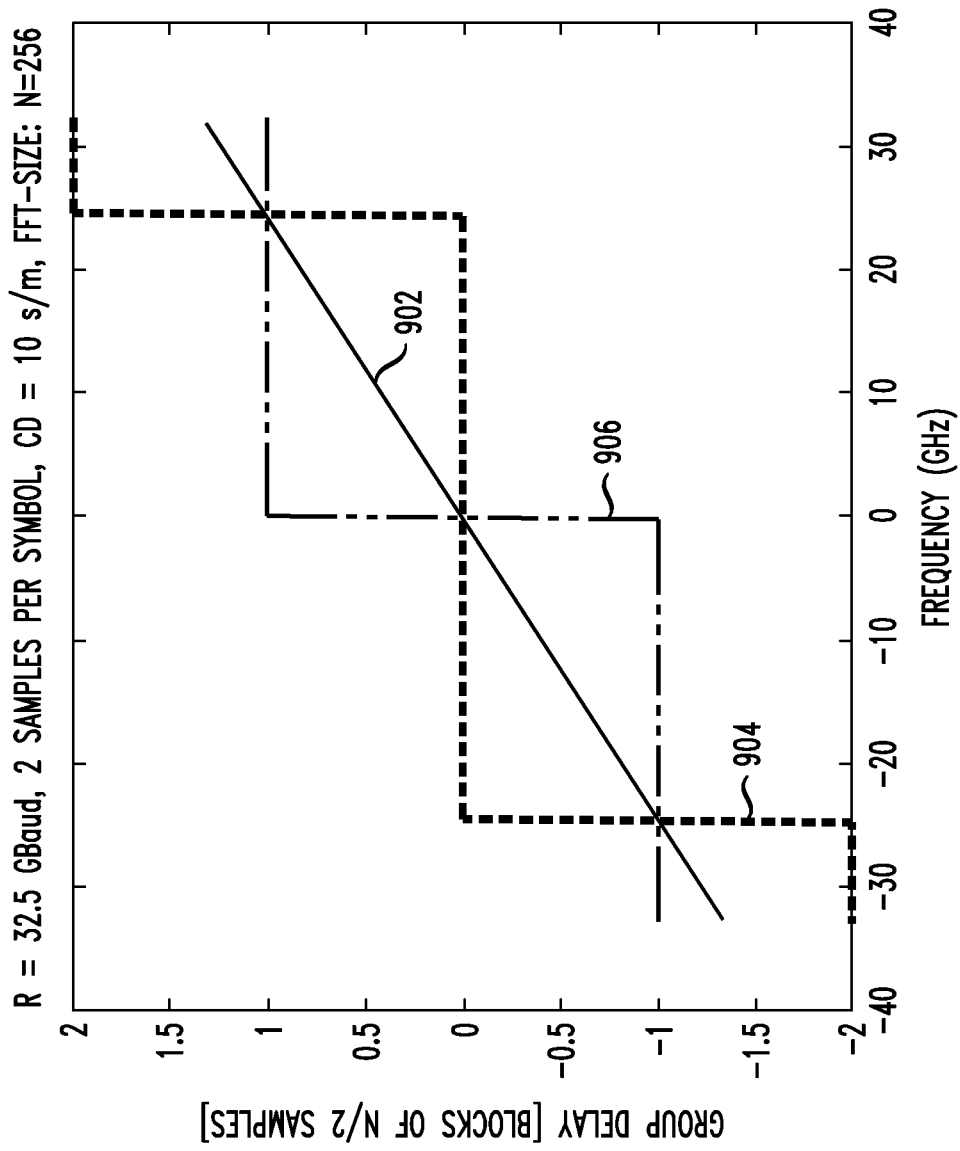
FIG. 9 graphically illustrates the signal processing implemented in the CD-compensation module of FIGS. 3A-3B according to an alternative embodiment of the disclosure.

FIG. 9 graphically illustrates the signal processing implemented in CDC module 300 (FIG. 3A) according to an alternative embodiment of the disclosure. More specifically, FIG. 9 graphically shows an alternative odd/even decomposition of vector $\vec{\Gamma}_{CD}$ that is different from that shown in FIG. 4.

In this embodiment, the odd decomposition of vector $\vec{\Gamma}_{CD}$ is given by Eq. (11):

$$\vec{\Gamma}_{CD} = 2\vec{\delta}_{CD}^{(odd)} T_{clk} + \vec{\delta}_{CD}^{(odd)} \quad (11)$$

where $\vec{\delta}_{CD}^{(odd)}$ is an integer-valued vector generated as $\rfloor \vec{\Gamma}_{CD}/2T_{clk}\lfloor$; and $\vec{\delta}_{CD}^{(odd)}$ is a vector consisting of the corresponding residual fractional (in terms of $2T_{clk}$) group delays. In FIG. 9, a stepped curve 904 shows the integer-valued vector $\vec{\delta}_{CD}^{(odd)}$ generated in accordance with Eq. (11) and corresponding to the group delay $\vec{\Gamma}_{CD}$ shown by a line 902.

The even decomposition of vector $\vec{\Gamma}_{CD}$ is given by Eq. (12):

$$\vec{\Gamma}_{CD} = 2(\vec{\delta}_{CD}^{(even)} + 1) T_{clk} + \vec{\gamma}_{CD}^{(even)} \quad (12)$$

where $\vec{\delta}_{CD}^{(even)}$ is an integer-valued vector generated as $\lfloor \vec{\Gamma}_{CD}/2T_{clk} \rfloor$, where the operator $\lfloor \bullet \rfloor$ denotes the rounding down towards the nearest integer; and $\vec{\gamma}_{CD}^{(even)}$ is a vector consisting of the corresponding residual fractional (in terms of $2T_{clk}$) group delays. In FIG. 9, a stepped curve 906 shows the vector $(\vec{\delta}_{CD}^{(even)} + 1)$ generated in accordance with Eq. (12) and corresponding to the group delay $\vec{\Gamma}_{CD}$ shown by line 902.

Based on the description provided above in reference to the odd/even decomposition of vector $\vec{\Gamma}_{CD}$ shown in FIG. 4, one of ordinary skill in the art will understand how to configure the individual FIR filters 332 in filter banks $330_1$ and $330_2$ to realize the filtering corresponding to the odd/even decomposition of vector $\vec{\Gamma}_{CD}$ expressed by Eqs. (11)-(12) and graphically shown in FIG. 9.

According to an example embodiment disclosed above in reference to FIGS. 1-9, provided is an apparatus comprising: an optical-to-electrical converter (e.g., 172, FIG. 1) configured to mix an optical input signal (e.g., 130', FIG. 1) with an optical reference signal (e.g., 158, FIG. 1) to generate a plurality of electrical digital measures (e.g., $168_1$-$168_4$, FIG. 1) of the optical input signal; and a digital circuit (e.g., 170, FIG. 1; 220, FIG. 2) configured to process the plurality of electrical digital measures to recover data (e.g., 102, FIG. 1) encoded in the optical input signal. The digital circuit comprises: a first signal-processing branch having a first plurality (e.g., $330_1$, FIGS. 3A, 7, 8) of linear filters (e.g., 332, FIG. 3B), each configured to apply a respective first quantized delay (e.g., proportional to a component of $\vec{\delta}_{CD}^{(odd)}$, Eq. (3) or (11)) to a respective spectral sub-band of a first set of spectral sub-bands (e.g., $322_1$, FIG. 3A) corresponding to the optical input signal to generate a respective one of a plurality of first delayed spectral sub-bands (e.g., on $344_1$, FIG. 3A); and a second signal-processing branch having a second plurality (e.g., $330_2$, FIGS. 3A, 7, 8) of linear filters (e.g., 332, FIG. 3B), each configured to apply a respective second quantized delay (e.g., proportional to a component of $\vec{\delta}_{CD}^{(even)}$ Eq. (4) or (12)) to a respective spectral sub-band of a second set of spectral sub-bands (e.g., $322_2$, FIG. 3A) corresponding to the optical input signal to generate a respective one of a plurality of second delayed spectral sub-bands (e.g., on a respective line of bus $344_2$, FIG. 3A). The digital circuit is configured to: combine digital signals corresponding to the first delayed spectral sub-bands and the second delayed spectral sub-bands to generate a processed digital signal (e.g., 222, FIGS. 2, 3A, 7, 8); and recover the data based on the processed digital signal.

In some embodiments of the above apparatus, each linear filter in the first plurality of linear filters is further configured to apply a respective first phase shift (e.g., Eq. (5) or Eq. (9)) to the respective spectral sub-band of the first set of spectral sub-bands; and each linear filter in the second plurality of linear filters is further configured to apply a respective second phase shift (e.g., Eq. (6) or Eq. (10)) to the respective spectral sub-band of the first set of spectral sub-bands.

In some embodiments of any of the above apparatus, each linear filter in the first plurality of linear filters is further configured to scale an amplitude of the respective spectral sub-band of the first set of spectral sub-bands using a respective first scaling factor (e.g., Eq. (7)); and each linear filter in the second plurality of linear filters is further configured to scale an amplitude of the respective spectral sub-band of the second set of spectral sub-bands using a respective second scaling factor (e.g., Eq. (8)).

In some embodiments of any of the above apparatus, the first scaling factors are selected to implement a first spectral amplitude profile (e.g., 502, FIG. 5; or 602, FIG. 6); and the second scaling factors are selected to implement a second spectral amplitude profile (e.g., 504, FIG. 5; or 604, FIG. 6) different from the first spectral amplitude profile.

In some embodiments of any of the above apparatus, the first spectral amplitude profile includes a first series of pass bands; and the second spectral amplitude profile includes a second series of pass bands positioned such that: an amplitude minimum in the first series is spectrally aligned with an amplitude maximum in the second series (e.g., as shown in FIG. 5 or 6); and an amplitude minimum in the second series is spectrally aligned with an amplitude maximum in the first series (e.g., as shown in FIG. 5 or 6).

In some embodiments of any of the above apparatus, the respective first quantized delay is a single quantized delay applied to the respective spectral sub-band of the first set of spectral sub-bands; and the respective second quantized delay is a single quantized delay applied to the respective spectral sub-band of the second set of spectral sub-bands.

In some embodiments of any of the above apparatus, the plurality of electrical digital measures are generated at a sampling frequency $f_s$; the first set of spectral sub-bands consists of N spectral sub-bands; and each of the respective first quantized delays is an integer multiple of $N/2f_s$.

In some embodiments of any of the above apparatus, each of the respective second quantized delays is an integer multiple of $N/2f_s$; and the second set of spectral sub-bands consists of N spectral sub-bands.

In some embodiments of any of the above apparatus, the digital circuit further comprises a filter controller (e.g., 230, FIG. 2) configured to cause the linear filters to reduce effects of chromatic dispersion on the processed digital signal.

In some embodiments of any of the above apparatus, the apparatus further comprises an optical fiber (e.g., 140, FIG. 1) configured to apply the optical input signal to the optical-to-electrical converter, wherein the effects of chromatic dispersion are caused by chromatic dispersion in the optical fiber.

In some embodiments of any of the above apparatus, a plurality of the respective first quantized delays comprises a first subset and a second subset; in the first subset, each of the respective first quantized delays is greater than a corresponding one of the respective second quantized delays; and in the second subset, each of the respective first quantized delays is equal to a corresponding one of the respective second quantized delays (e.g., $\vec{\delta}_{CD}^{(odd)} \geq \vec{\delta}_{CD}^{(even)}$, FIGS. 4 and 9).

In some embodiments of any of the above apparatus, in the first subset, each of the first respective quantized delays is greater than the corresponding one of the second respective quantized delays by exactly one clock cycle.

In some embodiments of any of the above apparatus, each of the linear filters comprises: a respective series of delay elements (e.g., $328_1$-$328_{M-1}$, FIG. 3B); a respective plurality of multipliers (e.g., $334_1$-$334_M$, FIG. 3B), each coupled to a corresponding tap in the respective series of delay elements; and a respective adder (e.g., 336, FIG. 3) configured to sum a plurality of digital signals received from the respective plurality of multipliers.

In some embodiments of any of the above apparatus, each of the linear filters is configured such that only a single multiplier in the respective plurality of multipliers is configured with a non-zero filter coefficient (e.g., one of filter coefficients $C_1$-$C_M$, FIG. 3B).

In some embodiments of any of the above apparatus, the second set of spectral sub-bands is a copy of the first set of spectral sub-bands.

In some embodiments of any of the above apparatus, the first signal-processing branch comprises a first inverse-Fourier-transform module (e.g., $350_1/360_1$, FIG. 3A) configured to generate a first sequence of time-domain samples (e.g., on line $362_1$, FIG. 3A) based on the plurality of first delayed spectral sub-bands; the second signal-processing branch comprises: a second inverse-Fourier-transform module (e.g., $350_2/360_2$, FIG. 3A) configured to generate a second sequence of time-domain samples (e.g., on line $362_2$, FIG. 3A) based on the plurality of second delayed spectral sub-bands; and a delay element (e.g., 370, FIG. 3A) configured to generate a delayed copy of the second sequence of time-domain samples; and the digital circuit further comprises an adder (e.g., 380, FIG. 3A) configured to generate the processed digital signal by summing the first sequence of time-domain samples and the delayed copy of the second sequence of time-domain samples.

In some embodiments of any of the above apparatus, the digital circuit further comprises: an adder (e.g., 780, FIG. 8) configured to generate a plurality of third delayed spectral sub-bands by summing the first and second delayed spectral sub-bands of equal frequencies; and an inverse-Fourier-transform module (e.g., 350/360, FIG. 8) configured to generate the processed digital signal based on the plurality of third delayed spectral sub-bands.

In some embodiments of any of the above apparatus, the first signal-processing branch comprises a first Fourier-transform module (e.g., $320_1$, FIG. 7) configured to generate the first set of spectral sub-bands based on a first copy of an electrical input signal (e.g., 212, FIG. 7) derived from the plurality of electrical digital measures; and the second signal-processing branch comprises: a delay element (e.g., 370, FIG. 7) configured to generate a delayed copy of said electrical input signal; and a second Fourier-transform module (e.g., $320_2$, FIG. 7) configured to generate the second set of spectral sub-bands based on said delayed copy.

In some embodiments of any of the above apparatus, the digital circuit further comprises: an adder (e.g., 780, FIG. 7) configured to generate a plurality of third delayed spectral sub-bands by summing the first and second delayed spectral sub-bands of equal frequencies; and an inverse-Fourier-transform module (e.g., 350/360, FIG. 7) configured to generate the processed digital signal based on the plurality of third delayed spectral sub-bands.

According to another example embodiment disclosed above in reference to FIGS. 1-9, provided is an apparatus comprising: means for generating a first approximation of a group delay (e.g., 402, FIGS. 4 and 9) corresponding to a received optical signal (e.g., 130', FIG. 1), said first approximation being based on a first step function (e.g., 404, FIG. 4; 904, FIG. 9), wherein each step has a fixed amplitude; means for generating a second approximation of the group delay, said first approximation being based on a second step function (e.g., 406, FIG. 4; 906, FIG. 9), wherein each step has the fixed amplitude, said second step function being different from the first step function; means for applying a respective first quantized delay determined from the first step function to a respective spectral sub-band of a first set of spectral sub-bands (e.g., $322_1$, FIG. 3A) corresponding to the received optical signal to generate a respective one of a plurality of first delayed spectral sub-bands (e.g., on $344_1$, FIG. 3A); means for applying a respective second quantized delay determined from the second step function to a respective spectral sub-band of a second set of spectral sub-bands (e.g., $322_2$, FIG. 3A) corresponding to the received optical signal to generate a respective one of a plurality of second delayed spectral sub-bands (e.g., on $344_1$, FIG. 3A); and means for combining electrical digital signals corresponding to the first delayed spectral sub-bands and the second delayed spectral sub-bands to generate a processed electrical digital signal (e.g., 222, FIGS. 2, 3A, 7, 8) in a manner that at least partially compensates effects of chromatic dispersion associated with the group delay on the processed electrical digital signal.

According to yet another example embodiment disclosed above in reference to FIGS. 1-9, provided is a signal-processing method comprising the steps of: generating a first approximation of a group delay (e.g., 402, FIGS. 4 and 9) corresponding to a received optical signal (e.g., 130', FIG. 1), said first approximation being based on a first step function (e.g., 404, FIG. 4; 904, FIG. 9), wherein each step has a fixed amplitude; generating a second approximation of the group delay, said first approximation being based on a second step function (e.g., 406, FIG. 4; 906, FIG. 9), wherein each step has the fixed amplitude, said second step function being different from the first step function; applying a respective first quantized delay determined from the first step function to a respective spectral sub-band of a first set of spectral sub-bands (e.g., $322_1$, FIG. 3A) corresponding to the received optical signal to generate a respective one of a plurality of first delayed spectral sub-bands (e.g., on $344_1$, FIG. 3A); applying a respective second quantized delay determined from the second step function to a respective spectral sub-band of a second set of spectral sub-bands (e.g., $322_2$, FIG. 3A) corresponding to the received optical signal to generate a respective one of a plurality of second delayed spectral sub-bands (e.g., on $344_1$, FIG. 3A); and combining electrical digital signals corresponding to the first delayed spectral sub-bands and the second delayed spectral sub-bands to generate a processed electrical digital signal (e.g., 222, FIGS. 2, 3A, 7, 8) in a manner that at least partially compensates effects of chromatic dispersion associated with the group delay on the processed electrical digital signal.

In some embodiments of the above method, a transition between adjacent steps in the first step function is spectrally aligned with a middle of a flat portion of a corresponding step in the second step function (e.g., as shown in FIG. 4 or 9); and a transition between adjacent steps in the second step function is spectrally aligned with a middle of a flat portion of a corresponding step in the first step function (e.g., as shown in FIG. 4 or 9).

While this disclosure includes references to illustrative embodiments, this description is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this disclosure may be made by those skilled in the art without departing from the scope of the disclosure as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment within the scope of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Various embodiments may be realized in other specific apparatus and/or methods. The described embodiments are to be considered in all respects as only illustrative and not restrictive. In particular, the scope is indicated by the appended claims rather than by the description and figures herein. All changes that come within the meaning and range of equivalency of the claims are to be embraced within their scope.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
    an optical-to-electrical converter configured to mix an optical input signal with an optical reference signal to generate a plurality of electrical digital measures of the optical input signal; and
    a digital circuit configured to process the plurality of electrical digital measures to recover data encoded in the optical input signal; and
    wherein the digital circuit comprises:
        a first signal-processing branch having a first plurality of linear filters, each configured to apply a respective first quantized delay to a respective spectral sub-band of a first set of spectral sub-bands corresponding to the optical input signal to generate a respective one of a plurality of first delayed spectral sub-bands; and
        a second signal-processing branch having a second plurality of linear filters, each configured to apply a respective second quantized delay to a respective spectral sub-band of a second set of spectral sub-bands corresponding to the optical input signal to generate a respective one of a plurality of second delayed spectral sub-bands; and wherein the digital circuit is configured to:
  combine digital signals corresponding to the first delayed spectral sub-bands and the second delayed spectral sub-bands to generate a processed digital signal; and
  recover the data based on the processed digital signal, wherein:
    the plurality of electrical digital measures are generated at a sampling frequency $f_s$;
    the first set of spectral sub-bands consists of N spectral sub-bands;
    each of the respective first quantized delays is an integer multiple of $N/2f_s$;
    each of the respective second quantized delays is an integer multiple of $N/2f_s$; and
    the second set of spectral sub-bands consists of N spectral sub-bands.

2. The apparatus of claim 1, wherein:
each linear filter in the first plurality of linear filters is further configured to apply a respective first phase shift to the respective spectral sub-band of the first set of spectral sub-bands; and
each linear filter in the second plurality of linear filters is further configured to apply a respective second phase shift to the respective spectral sub-band of the first set of spectral sub-bands.

3. The apparatus of claim 2, wherein:
each linear filter in the first plurality of linear filters is further configured to scale an amplitude of the respective spectral sub-band of the first set of spectral sub-bands using a respective first scaling factor; and
each linear filter in the second plurality of linear filters is further configured to scale an amplitude of the respective spectral sub-band of the second set of spectral sub-bands using a respective second scaling factor.

4. The apparatus of claim 3, wherein:
the first scaling factors are selected to implement a first spectral amplitude profile; and
the second scaling factors are selected to implement a second spectral amplitude profile different from the first spectral amplitude profile.

5. The apparatus of claim 4, wherein:
the first spectral amplitude profile includes a first series of pass bands; and
the second spectral amplitude profile includes a second series of pass bands positioned such that:
  an amplitude minimum in the first series is spectrally aligned with an amplitude maximum in the second series; and
  an amplitude minimum in the second series is spectrally aligned with an amplitude maximum in the first series.

6. The apparatus of claim 1, wherein:
the respective first quantized delay is a single quantized delay applied to the respective spectral sub-band of the first set of spectral sub-bands; and
the respective second quantized delay is a single quantized delay applied to the respective spectral sub-band of the second set of spectral sub-bands.

7. The apparatus of claim 1, wherein:
the digital circuit further comprises a filter controller configured to cause the linear filters to reduce effects of chromatic dispersion on the processed digital signal; and
the apparatus further comprises an optical fiber configured to apply the optical input signal to the optical-to-electrical converter, wherein the effects of chromatic dispersion are caused by chromatic dispersion in the optical fiber.

8. The apparatus of claim 1, wherein:
a plurality of the respective first quantized delays comprises a first subset and a second subset;
in the first subset, each of the respective first quantized delays is greater than a corresponding one of the respective second quantized delays; and
in the second subset, each of the respective first quantized delays is equal to a corresponding one of the respective second quantized delays.

9. The apparatus of claim 8, wherein, in the first subset, each of the first respective quantized delays is greater than the corresponding one of the second respective quantized delays by exactly one clock cycle.

10. The apparatus of claim 1, wherein each of the linear filters comprises:
  a respective series of delay elements;
  a respective plurality of multipliers, each coupled to a corresponding tap in the respective series of delay elements; and
  a respective adder configured to sum a plurality of digital signals received from the respective plurality of multipliers.

11. The apparatus of claim 10, wherein each of the linear filters is configured such that only a single multiplier in the respective plurality of multipliers is configured with a non-zero filter coefficient.

12. The apparatus of claim 1, wherein the second set of spectral sub-bands is a copy of the first set of spectral sub-bands.

13. The apparatus of claim 12, wherein:
the first signal-processing branch comprises a first inverse-Fourier-transform module configured to generate a first sequence of time-domain samples based on the plurality of first delayed spectral sub-bands;
the second signal-processing branch comprises:
  a second inverse-Fourier-transform module configured to generate a second sequence of time-domain samples based on the plurality of second delayed spectral sub-bands; and
  a delay element configured to generate a delayed copy of the second sequence of time-domain samples; and
the digital circuit further comprises an adder configured to generate the processed digital signal by summing the first sequence of time-domain samples and the delayed copy of the second sequence of time-domain samples.

14. The apparatus of claim 12, wherein the digital circuit further comprises:
  an adder configured to generate a plurality of third delayed spectral sub-bands by summing the first and second delayed spectral sub-bands of equal frequencies; and
  an inverse-Fourier-transform module configured to generate the processed digital signal based on the plurality of third delayed spectral sub-bands.

15. The apparatus of claim 1, wherein:
the first signal-processing branch comprises a first Fourier-transform module configured to generate the first set of spectral sub-bands based on a first copy of an electrical input signal derived from the plurality of electrical digital measures; and
the second signal-processing branch comprises:
  a delay element configured to generate a delayed copy of said electrical input signal; and
  a second Fourier-transform module configured to generate the second set of spectral sub-bands based on said delayed copy.

16. The apparatus of claim 15, wherein the digital circuit further comprises:
- an adder configured to generate a plurality of third delayed spectral sub-bands by summing the first and second delayed spectral sub-bands of equal frequencies; and
- an inverse-Fourier-transform module configured to generate the processed digital signal based on the plurality of third delayed spectral sub-bands.

17. A signal-processing method comprising:
- generating a first approximation of a group delay corresponding to a received optical signal, said first approximation being based on a first step function, wherein each step has a fixed amplitude;
- generating a second approximation of the group delay, said second approximation being based on a second step function, wherein each step has the fixed amplitude, said second step function being different from the first step function;
- applying a respective first quantized delay determined from the first step function to a respective spectral sub-band of a first set of spectral sub-bands corresponding to the received optical signal to generate a respective one of a plurality of first delayed spectral sub-bands;
- applying a respective second quantized delay determined from the second step function to a respective spectral sub-band of a second set of spectral sub-bands corresponding to the received optical signal to generate a respective one of a plurality of second delayed spectral sub-bands; and
- combining electrical digital signals corresponding to the first delayed spectral sub-bands and the second delayed spectral sub-bands to generate a processed electrical digital signal in a manner that at least partially compensates effects of chromatic dispersion associated with the group delay on the processed electrical digital signal.

18. The method of claim 17, wherein:
- a transition between adjacent steps in the first step function is spectrally aligned with a middle of a flat portion of a corresponding step in the second step function; and
- a transition between adjacent steps in the second step function is spectrally aligned with a middle of a flat portion of a corresponding step in the first step function.

19. An apparatus comprising:
- means for generating a first approximation of a group delay corresponding to a received optical signal, said first approximation being based on a first step function, wherein each step has a fixed amplitude;
- means for generating a second approximation of the group delay, said second approximation being based on a second step function, wherein each step has the fixed amplitude, said second step function being different from the first step function;
- means for applying a respective first quantized delay determined from the first step function to a respective spectral sub-band of a first set of spectral sub-bands corresponding to the received optical signal to generate a respective one of a plurality of first delayed spectral sub-bands;
- means for applying a respective second quantized delay determined from the second step function to a respective spectral sub-band of a second set of spectral sub-bands corresponding to the received optical signal to generate a respective one of a plurality of second delayed spectral sub-bands; and
- means for combining electrical digital signals corresponding to the first delayed spectral sub-bands and the second delayed spectral sub-bands to generate a processed electrical digital signal in a manner that at least partially compensates effects of chromatic dispersion associated with the group delay on the processed electrical digital signal.

20. An apparatus comprising:
- an optical-to-electrical converter configured to mix an optical input signal with an optical reference signal to generate a plurality of electrical digital measures of the optical input signal; and
- a digital circuit configured to process the plurality of electrical digital measures to recover data encoded in the optical input signal; and
- wherein the digital circuit comprises:
- a first signal-processing branch having a first plurality of linear filters, each configured to apply a respective first quantized delay to a respective spectral sub-band of a first set of spectral sub-bands corresponding to the optical input signal to generate a respective one of a plurality of first delayed spectral sub-bands; and
- a second signal-processing branch having a second plurality of linear filters, each configured to apply a respective second quantized delay to a respective spectral sub-band of a second set of spectral sub-bands corresponding to the optical input signal to generate a respective one of a plurality of second delayed spectral sub-bands; and
- wherein the digital circuit is configured to:
    - combine digital signals corresponding to the first delayed spectral sub-bands and the second delayed spectral sub-bands to generate a processed digital signal; and
    - recover the data based on the processed digital signal; and
- wherein:
    - each linear filter in the first plurality of linear filters is further configured to apply a respective first phase shift to the respective spectral sub-band of the first set of spectral sub-bands;
    - each linear filter in the second plurality of linear filters is further configured to apply a respective second phase shift to the respective spectral sub-band of the first set of spectral sub-bands;
    - each linear filter in the first plurality of linear filters is further configured to scale an amplitude of the respective spectral sub-band of the first set of spectral sub-bands using a respective first scaling factor; and
    - each linear filter in the second plurality of linear filters is further configured to scale an amplitude of the respective spectral sub-band of the second set of spectral sub-bands using a respective second scaling factor.

21. The apparatus of claim 20, wherein:
- the first scaling factors are selected to implement a first spectral amplitude profile; and
- the second scaling factors are selected to implement a second spectral amplitude profile different from the first spectral amplitude profile.

22. The apparatus of claim 21, wherein:
- the first spectral amplitude profile includes a first series of pass bands; and
- the second spectral amplitude profile includes a second series of pass bands positioned such that:
    - an amplitude minimum in the first series is spectrally aligned with an amplitude maximum in the second series; and
    - an amplitude minimum in the second series is spectrally aligned with an amplitude maximum in the first series.

23. An apparatus comprising:
an optical-to-electrical converter configured to mix an optical input signal with an optical reference signal to generate a plurality of electrical digital measures of the optical input signal; and
a digital circuit configured to process the plurality of electrical digital measures to recover data encoded in the optical input signal; and
wherein the digital circuit comprises:
   a first signal-processing branch having a first plurality of linear filters, each configured to apply a respective first quantized delay to a respective spectral sub-band of a first set of spectral sub-bands corresponding to the optical input signal to generate a respective one of a plurality of first delayed spectral sub-bands; and
   a second signal-processing branch having a second plurality of linear filters, each configured to apply a respective second quantized delay to a respective spectral sub-band of a second set of spectral sub-bands corresponding to the optical input signal to generate a respective one of a plurality of second delayed spectral sub-bands; and
wherein the digital circuit is configured to:
   combine digital signals corresponding to the first delayed spectral sub-bands and the second delayed spectral sub-bands to generate a processed digital signal; and
   recover the data based on the processed digital signal, wherein:
a plurality of the respective first quantized delays comprises a first subset and a second subset;
in the first subset, each of the respective first quantized delays is greater than a corresponding one of the respective second quantized delays;
in the second subset, each of the respective first quantized delays is equal to a corresponding one of the respective second quantized delays; and
in the first subset, each of the first respective quantized delays is greater than the corresponding one of the second respective quantized delays by exactly one clock cycle.

24. An apparatus comprising:
an optical-to-electrical converter configured to mix an optical input signal with an optical reference signal to generate a plurality of electrical digital measures of the optical input signal; and
a digital circuit configured to process the plurality of electrical digital measures to recover data encoded in the optical input signal; and
wherein the digital circuit comprises:
   a first signal-processing branch having a first plurality of linear filters, each configured to apply a respective first quantized delay to a respective spectral sub-band of a first set of spectral sub-bands corresponding to the optical input signal to generate a respective one of a plurality of first delayed spectral sub-bands; and
   a second signal-processing branch having a second plurality of linear filters, each configured to apply a respective second quantized delay to a respective spectral sub-band of a second set of spectral sub-bands corresponding to the optical input signal to generate a respective one of a plurality of second delayed spectral sub-bands;
wherein the digital circuit is configured to:
   combine digital signals corresponding to the first delayed spectral sub-bands and the second delayed spectral sub-bands to generate a processed digital signal; and
   recover the data based on the processed digital signal;
wherein each of the linear filters comprises:
   a respective series of delay elements;
   a respective plurality of multipliers, each coupled to a corresponding tap in the respective series of delay elements; and
   a respective adder configured to sum a plurality of digital signals received from the respective plurality of multipliers; and
wherein each of the linear filters is configured such that only a single multiplier in the respective plurality of multipliers is configured with a non-zero filter coefficient.

25. An apparatus comprising:
an optical-to-electrical converter configured to mix an optical input signal with an optical reference signal to generate a plurality of electrical digital measures of the optical input signal; and
a digital circuit configured to process the plurality of electrical digital measures to recover data encoded in the optical input signal; and
wherein the digital circuit comprises:
   a first signal-processing branch having a first plurality of linear filters, each configured to apply a respective first quantized delay to a respective spectral sub-band of a first set of spectral sub-bands corresponding to the optical input signal to generate a respective one of a plurality of first delayed spectral sub-bands; and
   a second signal-processing branch having a second plurality of linear filters, each configured to apply a respective second quantized delay to a respective spectral sub-band of a second set of spectral sub-bands corresponding to the optical input signal to generate a respective one of a plurality of second delayed spectral sub-bands;
wherein the digital circuit is configured to:
   combine digital signals corresponding to the first delayed spectral sub-bands and the second delayed spectral sub-bands to generate a processed digital signal; and
   recover the data based on the processed digital signal;
wherein the second set of spectral sub-bands is a copy of the first set of spectral sub-bands; and
wherein:
   the first signal-processing branch comprises a first inverse-Fourier-transform module configured to generate a first sequence of time-domain samples based on the plurality of first delayed spectral sub-bands;
   the second signal-processing branch comprises:
   a second inverse-Fourier-transform module configured to generate a second sequence of time-domain samples based on the plurality of second delayed spectral sub-bands; and
   a delay element configured to generate a delayed copy of the second sequence of time-domain samples; and
   the digital circuit further comprises an adder configured to generate the processed digital signal by summing the first sequence of time-domain samples and the delayed copy of the second sequence of time-domain samples.

26. An apparatus comprising:
an optical-to-electrical converter configured to mix an optical input signal with an optical reference signal to generate a plurality of electrical digital measures of the optical input signal; and
a digital circuit configured to process the plurality of electrical digital measures to recover data encoded in the optical input signal; and
wherein the digital circuit comprises:
a first signal-processing branch having a first plurality of linear filters, each configured to apply a respective first quantized delay to a respective spectral sub-band of a first set of spectral sub-bands corresponding to the optical input signal to generate a respective one of a plurality of first delayed spectral sub-bands; and
a second signal-processing branch having a second plurality of linear filters, each configured to apply a respective second quantized delay to a respective spectral sub-band of a second set of spectral sub-bands corresponding to the optical input signal to generate a respective one of a plurality of second delayed spectral sub-bands;
wherein the digital circuit is configured to:
combine digital signals corresponding to the first delayed spectral sub-bands and the second delayed spectral sub-bands to generate a processed digital signal; and
recover the data based on the processed digital signal;
wherein the second set of spectral sub-bands is a copy of the first set of spectral sub-bands; and
wherein the digital circuit further comprises:
an adder configured to generate a plurality of third delayed spectral sub-bands by summing the first and second delayed spectral sub-bands of equal frequencies; and
an inverse-Fourier-transform module configured to generate the processed digital signal based on the plurality of third delayed spectral sub-bands.

27. An apparatus comprising:
an optical-to-electrical converter configured to mix an optical input signal with an optical reference signal to generate a plurality of electrical digital measures of the optical input signal; and
a digital circuit configured to process the plurality of electrical digital measures to recover data encoded in the optical input signal; and
wherein the digital circuit comprises:
a first signal-processing branch having a first plurality of linear filters, each configured to apply a respective first quantized delay to a respective spectral sub-band of a first set of spectral sub-bands corresponding to the optical input signal to generate a respective one of a plurality of first delayed spectral sub-bands; and
a second signal-processing branch having a second plurality of linear filters, each configured to apply a respective second quantized delay to a respective spectral sub-band of a second set of spectral sub-bands corresponding to the optical input signal to generate a respective one of a plurality of second delayed spectral sub-bands;
wherein the digital circuit is configured to:
combine digital signals corresponding to the first delayed spectral sub-bands and the second delayed spectral sub-bands to generate a processed digital signal; and
recover the data based on the processed digital signal;
wherein the first signal-processing branch comprises a first Fourier-transform module configured to generate the first set of spectral sub-bands based on a first copy of an electrical input signal derived from the plurality of electrical digital measures; and
wherein the second signal-processing branch comprises:
a delay element configured to generate a delayed copy of said electrical input signal; and
a second Fourier-transform module configured to generate the second set of spectral sub- bands based on said delayed copy.

28. The apparatus of claim 27, wherein the digital circuit further comprises:
an adder configured to generate a plurality of third delayed spectral sub-bands by summing the first and second delayed spectral sub-bands of equal frequencies; and
an inverse-Fourier-transform module configured to generate the processed digital signal based on the plurality of third delayed spectral sub-bands.

29. A method comprising:
configuring an electronic signal processor of an optical receiver to generate a first approximation of a group delay corresponding to a received optical signal, said first approximation being based on a first step function, wherein each step has a fixed amplitude;
configuring the electronic signal processor to generate a second approximation of the group delay, said second approximation being based on a second step function, wherein each step has the fixed amplitude, said second step function being different from the first step function;
configuring the electronic signal processor to apply a respective first quantized delay determined from the first step function to a respective spectral sub-band of a first set of spectral sub-bands corresponding to the received optical signal to generate a respective one of a plurality of first delayed spectral sub-bands;
configuring the electronic signal processor to apply a respective second quantized delay determined from the second step function to a respective spectral sub-band of a second set of spectral sub-bands corresponding to the received optical signal to generate a respective one of a plurality of second delayed spectral sub-bands; and
configuring the electronic signal processor to combine electrical digital signals corresponding to the first delayed spectral sub-bands and the second delayed spectral sub-bands to generate a processed electrical digital signal in a manner that at least partially compensates effects of chromatic dispersion associated with the group delay on the processed electrical digital signal.

* * * * *